(12) United States Patent
Hultzman et al.

(10) Patent No.: US 12,106,177 B2
(45) Date of Patent: Oct. 1, 2024

(54) LOTTERY TERMINAL INCLUDING A DOCUMENT READER

(71) Applicant: IGT Global Solutions Corporation, Providence, RI (US)

(72) Inventors: Scott Hultzman, Putnam, CT (US); David Anagnostos, Warren, RI (US)

(73) Assignee: IGT Global Solutions Corporation, Providence, RI (US)

( * ) Notice: Subject to any disclaimer, the term of this patent is extended or adjusted under 35 U.S.C. 154(b) by 0 days.

(21) Appl. No.: 18/175,699

(22) Filed: Feb. 28, 2023

(65) Prior Publication Data
US 2024/0289575 A1   Aug. 29, 2024

(51) Int. Cl.
*G06K 7/14*   (2006.01)

(52) U.S. Cl.
CPC ......... *G06K 7/1417* (2013.01); *G06K 7/1413* (2013.01)

(58) Field of Classification Search
CPC ............................ G06K 7/1417; G06K 7/1413
USPC ....................................................... 235/462.1
See application file for complete search history.

(56) References Cited

U.S. PATENT DOCUMENTS

| | | | | |
|---|---|---|---|---|
| 8,113,429 B2 * | 2/2012 | Craig | ................. | G06K 7/10881 235/472.01 |
| 9,098,979 B2 * | 8/2015 | Cong | .................. | H04N 1/1225 |
| 2008/0182639 A1 * | 7/2008 | Antonopoulos | ......... | G07G 1/12 463/17 |
| 2010/0174613 A1 * | 7/2010 | Oram | .................. | G07F 17/3255 358/1.15 |
| 2014/0004922 A1 * | 1/2014 | Behm | ................... | G07F 17/329 463/17 |
| 2017/0004671 A1 * | 1/2017 | Connolly | ................ | G07F 11/44 |
| 2019/0206181 A1 * | 7/2019 | Sugai | ...................... | G06T 13/20 |
| 2020/0074576 A1 * | 3/2020 | Kaiblinger | ............. | G06Q 50/34 |
| 2023/0177482 A1 * | 6/2023 | Muraharirao | .......... | G06Q 50/34 705/21 |

OTHER PUBLICATIONS

"Altura Lottery Terminal Retailer Reference Guide", North Carolina Education Lottery, Jul. 2016.
"Retailer Pro", IGT high-performance point-of-sale terminal, promotional information available online before the priority date of this patent application.
"Retailer Pro Reader Legacy Terminal", various views of legacy terminals available before the priority date of this patent application.
"Retailer Select Lottery Terminal", IGT promotional information available online before the priority date of this patent application.
"Retailer Vue Lottery Terminal", IGT promotional information available online before the priority date of this patent application.

* cited by examiner

*Primary Examiner* — Ahshik Kim
(74) *Attorney, Agent, or Firm* — Neal, Gerber & Eisenberg LLP

(57) ABSTRACT

A lottery terminal that includes a housing, a display device pivotally connected to the housing, the display device upwardly pivotable from a closed position to a fully open position, and a lottery ticket play slip reader including a document mover and a scanner holder pivotally connected to the document mover, the scanner holder downwardly pivotal from a closed position to a fully open position to provide full, easy, and quick access to a scanner supported by the scanner holder.

13 Claims, 24 Drawing Sheets

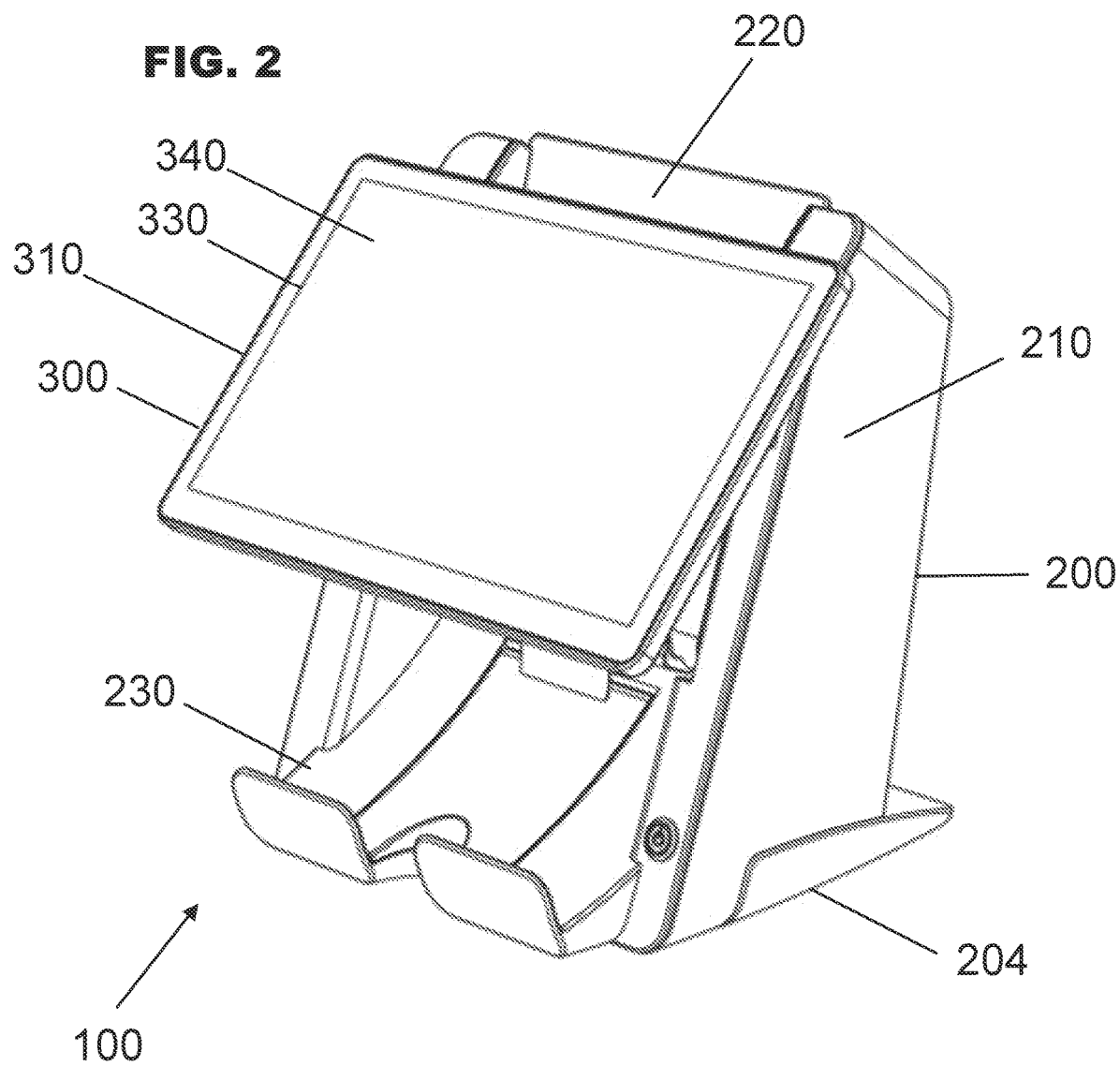

ated manners 15 open position with respect to the housing. In the closed

LOTTERY TERMINAL INCLUDING A DOCUMENT READER

CROSS-REFERENCE TO RELATED APPLICATIONS

This application is related to the following commonly owned patent application: U.S. application Ser. No. 29/871,810, entitled "LOTTERY TERMINAL".

BACKGROUND

The present disclosure relates to a lottery terminal including a document reader.

Lottery tickets may be sold in variety of different manners using a variety of different systems such as systems that include lottery terminals. For a draw lottery ticket for a draw lottery game, a player may select the player's numbers or may have the system randomly select the player's numbers (which is often referred to as a quick pick). To purchase a draw lottery ticket in person with player selected numbers, a player may fill out a paper lottery ticket play slip with the player selected numbers and provide that lottery ticket play slip to an operator of a lottery terminal. The operator scans the paper lottery ticket play slip via a lottery ticket play slip reader that is part of a lottery terminal to determine the player's numbers. The lottery terminal uses the scanned data to generate a draw lottery ticket for the player. Such lottery ticket play slip readers include a scanner surface that needs to cleaned on a regular basis. Access to the play slip reader also needs to be provided for manual clearing of play slips that become jammed. Certain known lottery terminals with lottery ticket play slip readers have mechanisms that do not provide full access to such scanners and/or that do make access to such scanners relatively time consuming or difficult to access.

BRIEF SUMMARY

In various embodiments, the present disclosure provides a lottery terminal including: a housing; a scanner holder pivotally supported by the housing, the scanner holder is downwardly pivotal from a closed position to a fully open position; a scanner supported by the scanner holder; and a display device pivotally connected to the housing, the display device is upwardly pivotal from a closed position to a fully open position.

In various other embodiments, the present disclosure provides a lottery terminal including: a housing; a play slip reader including: a document mover connected to the housing, a scanner holder pivotally connected to the document mover, the scanner holder is downwardly pivotal from a closed position to a fully open position, and a scanner supported by the scanner holder, wherein in the closed position, the scanner holder holds the scanner in a position facing the document mover; and a display device pivotally connected to the housing. The display device is upwardly pivotal from a closed position to a fully open position, wherein in the closed position, the display device is in a position on an opposite side of the scanner holder as the document mover, and wherein when the display device is in the fully open position, the display device extends above the housing.

In various other embodiments, the present disclosure provides a lottery terminal including: a housing; a play slip reader including: a document mover connected to the housing, a scanner holder pivotally connected to the document mover, the scanner holder is downwardly pivotal from a closed position to a fully open position, and a scanner supported by the scanner holder, wherein in the closed position, the scanner holder holds the scanner in a position facing the document mover; and a display device comprising a display device frame pivotally connected to the housing, a display screen supported by the display device frame, a touch screen supported by the display device frame in front of the display screen, a first pivot arm connected to and extending from a first side of the display device frame, and a second pivot arm connected to and extending from a second side of the display device frame. Each of the first pivot arm and the second pivot arm is J-shaped. The display device is upwardly pivotal from a closed position to a fully open position with respect to the housing. In the closed position, the display device is in a position on an opposite side of the scanner holder as the document mover. When the display device is in the fully open position, the display device extends above the housing. The display device and the scanner holder are configured such that the display device needs to be pivoted toward its fully open position before the scanner holder can be downwardly pivoted toward its fully open position.

Additional features are described in, and will be apparent from, the following Detailed Description and the figures.

BRIEF DESCRIPTION OF THE SEVERAL VIEWS OF THE DRAWINGS

FIG. 2 is a front perspective view of the lottery terminal of FIG. 1, wherein the display device is in a partially open position and the scanner holder is in the closed position.

DETAILED DESCRIPTION

Figure 1:
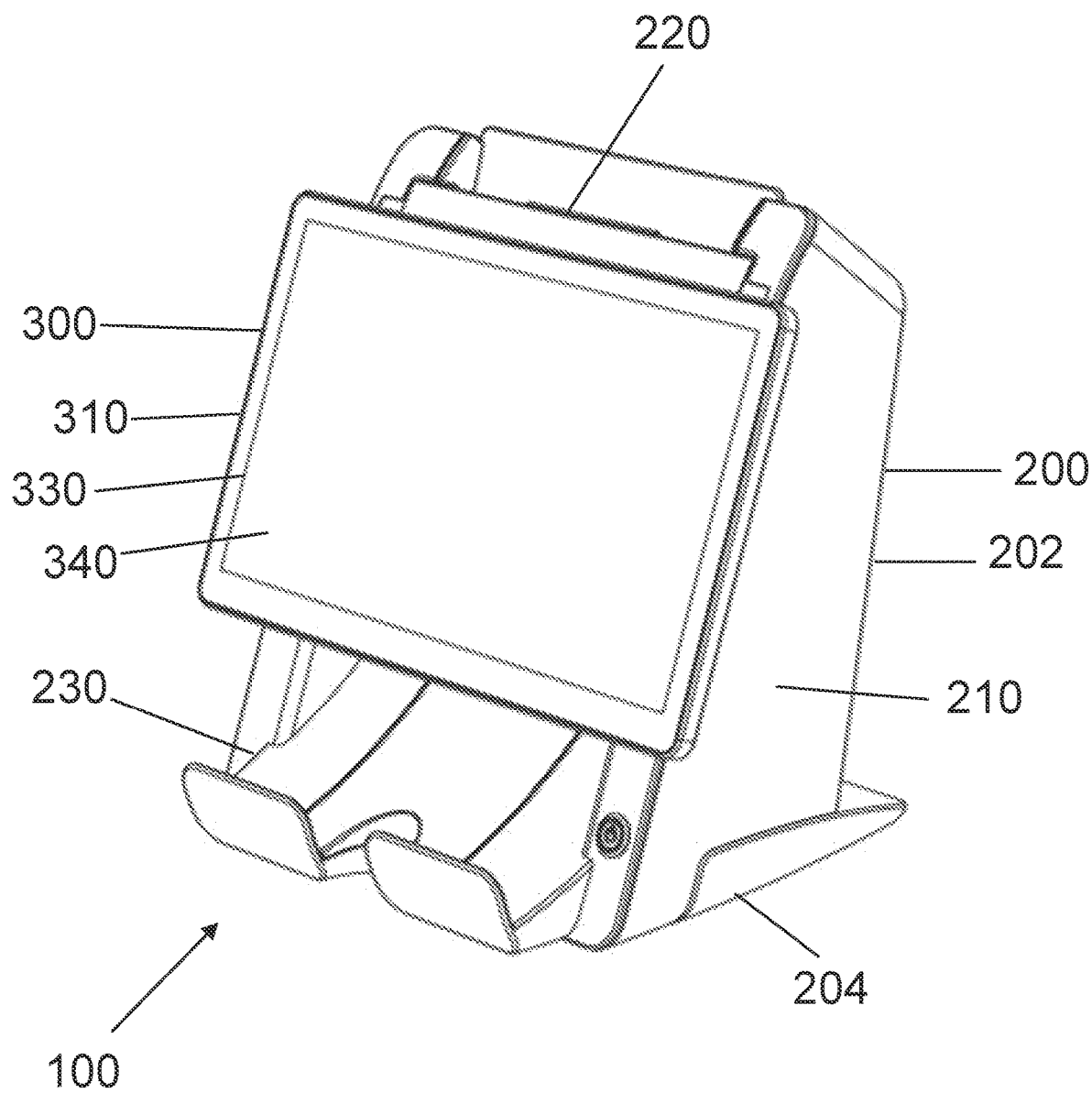
FIG. 1 is a front perspective view of a lottery terminal with a play slip reader of one example embodiment of the present disclosure, wherein the display device thereof is in the closed position and the scanner holder thereof is in the closed position.
Figure 1A:
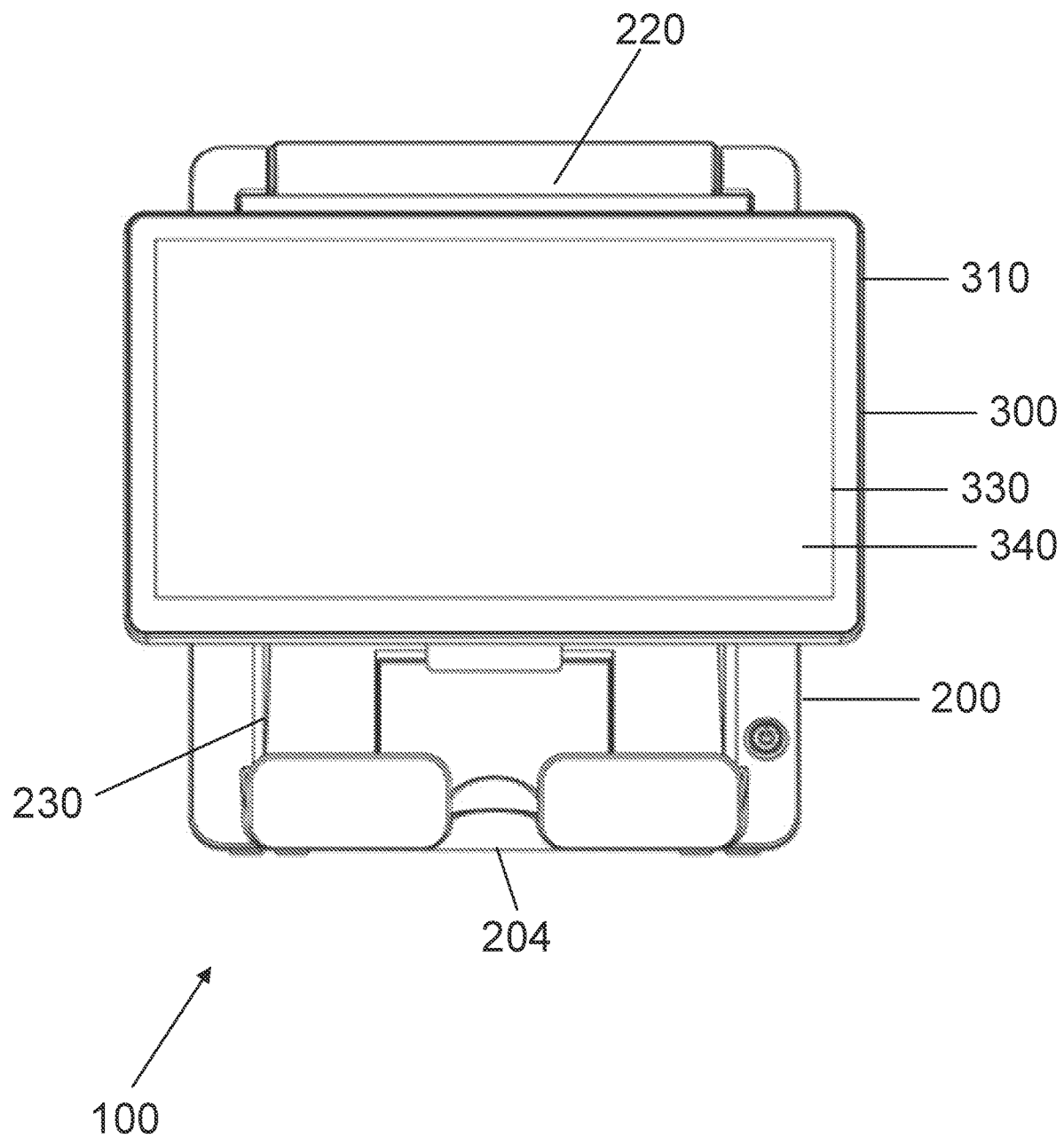
FIG. 1A is a front view of the lottery terminal of FIG. 1, wherein the display device is in the closed position and the scanner holder is in the closed position.
Figure 1B:
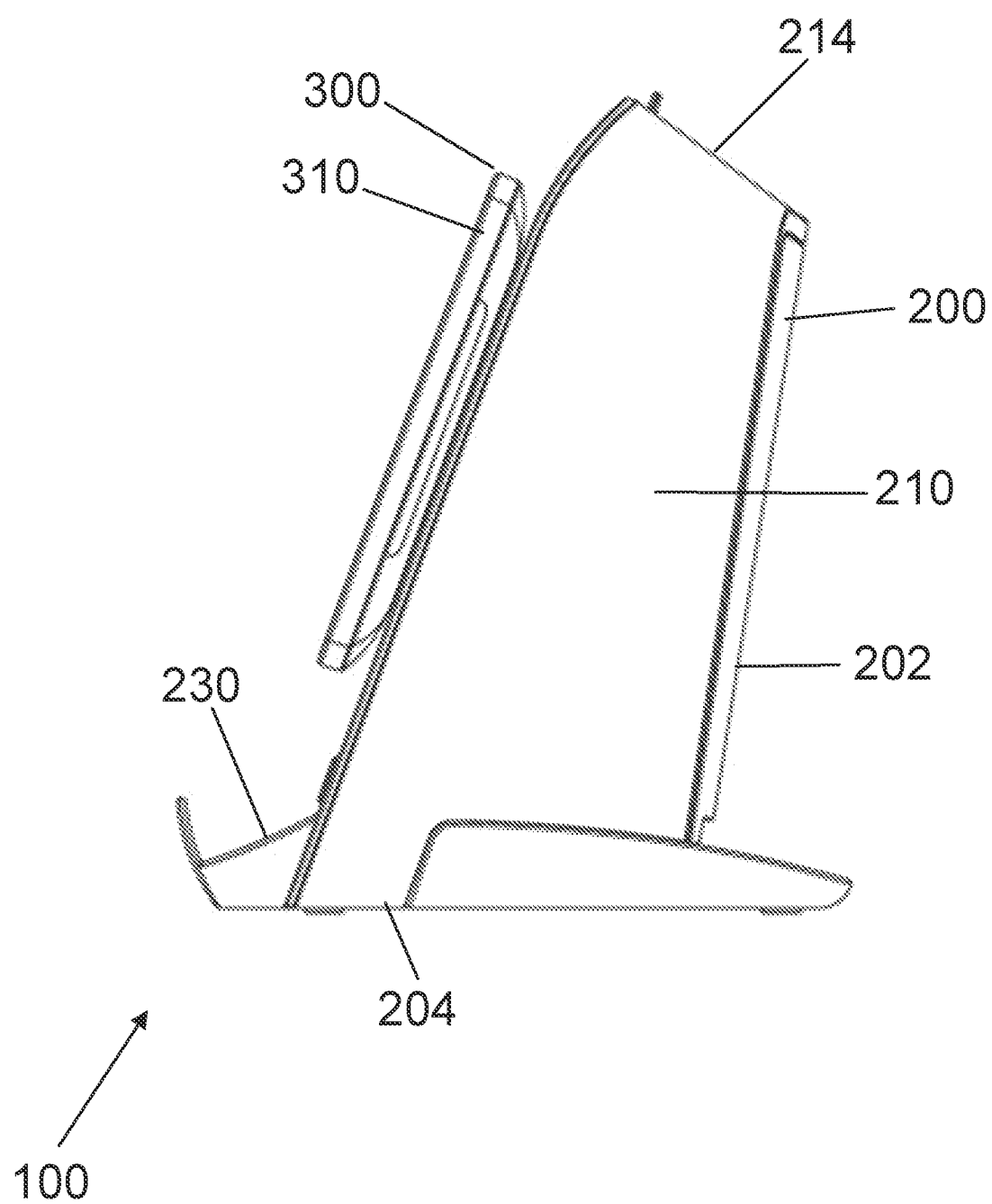
FIG. 1B is a side view of the lottery terminal of FIG. 1, wherein the display device is in the closed position and the scanner holder is in the closed position.
Figure 1C:
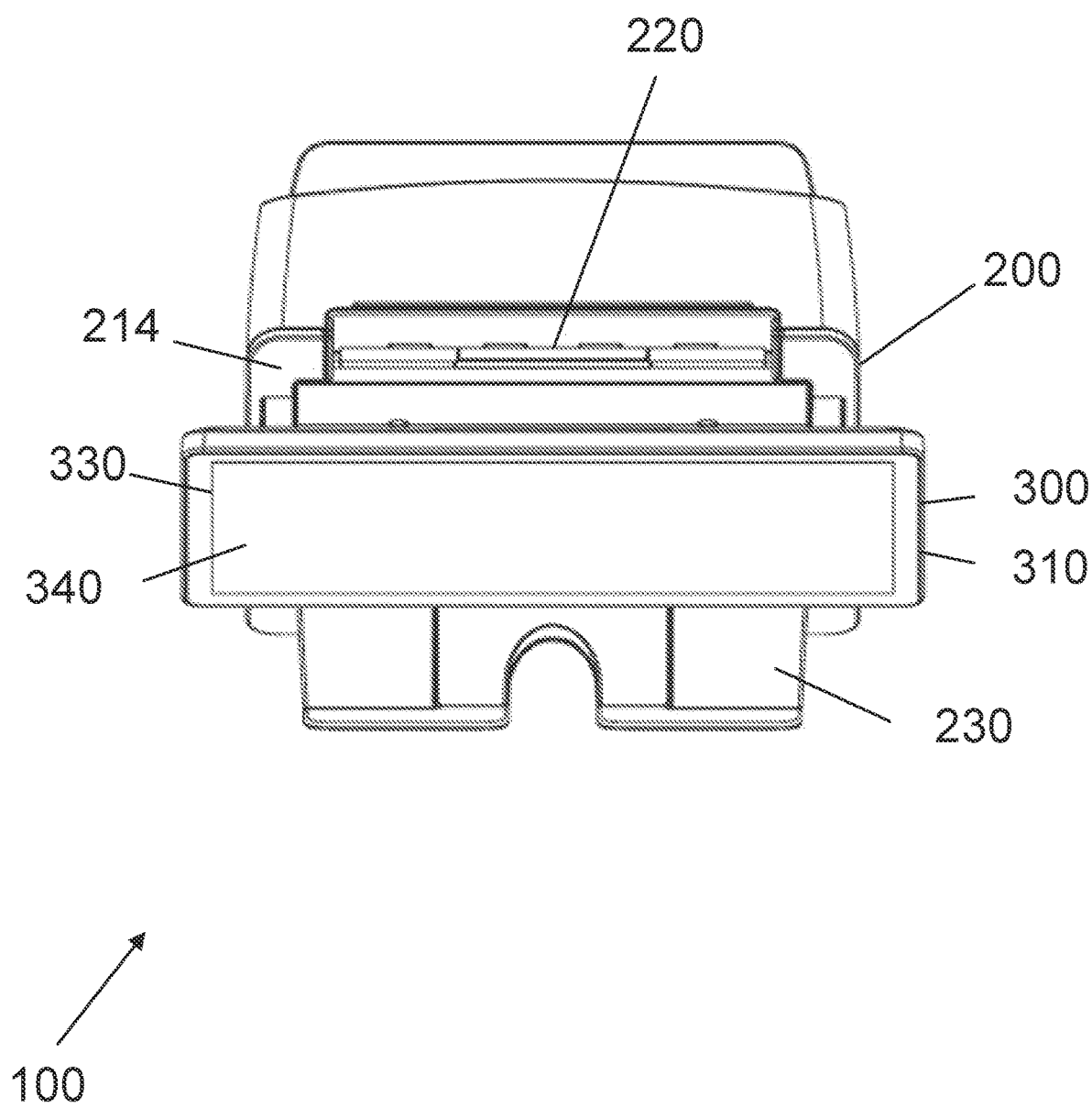
FIG. 1C is a top view of the lottery terminal of FIG. 1, wherein the display device is in the closed position and the scanner holder is in the closed position.
Figure 1D:
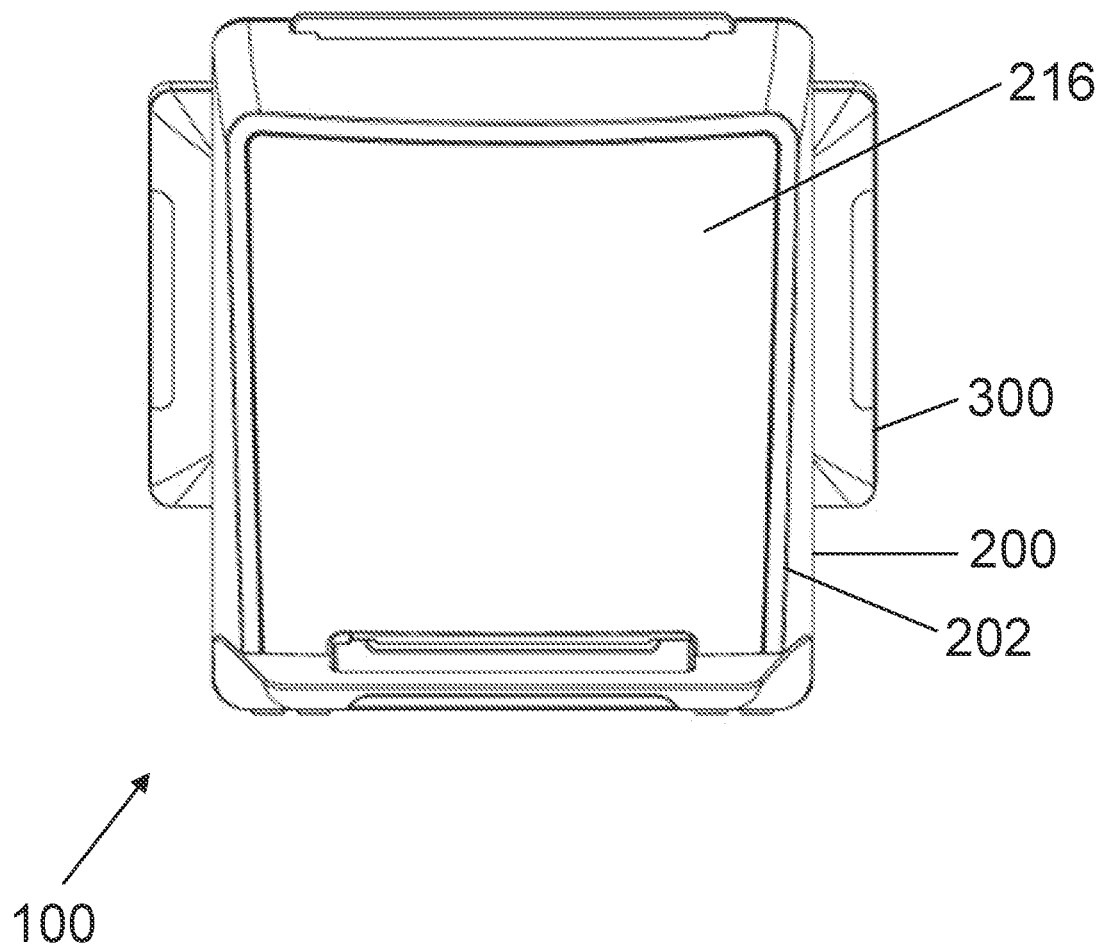
FIG. 1D is a rear view of the lottery terminal of FIG. 1, wherein the display device is in the closed position and the scanner holder is in the closed position.
Figure 2A:
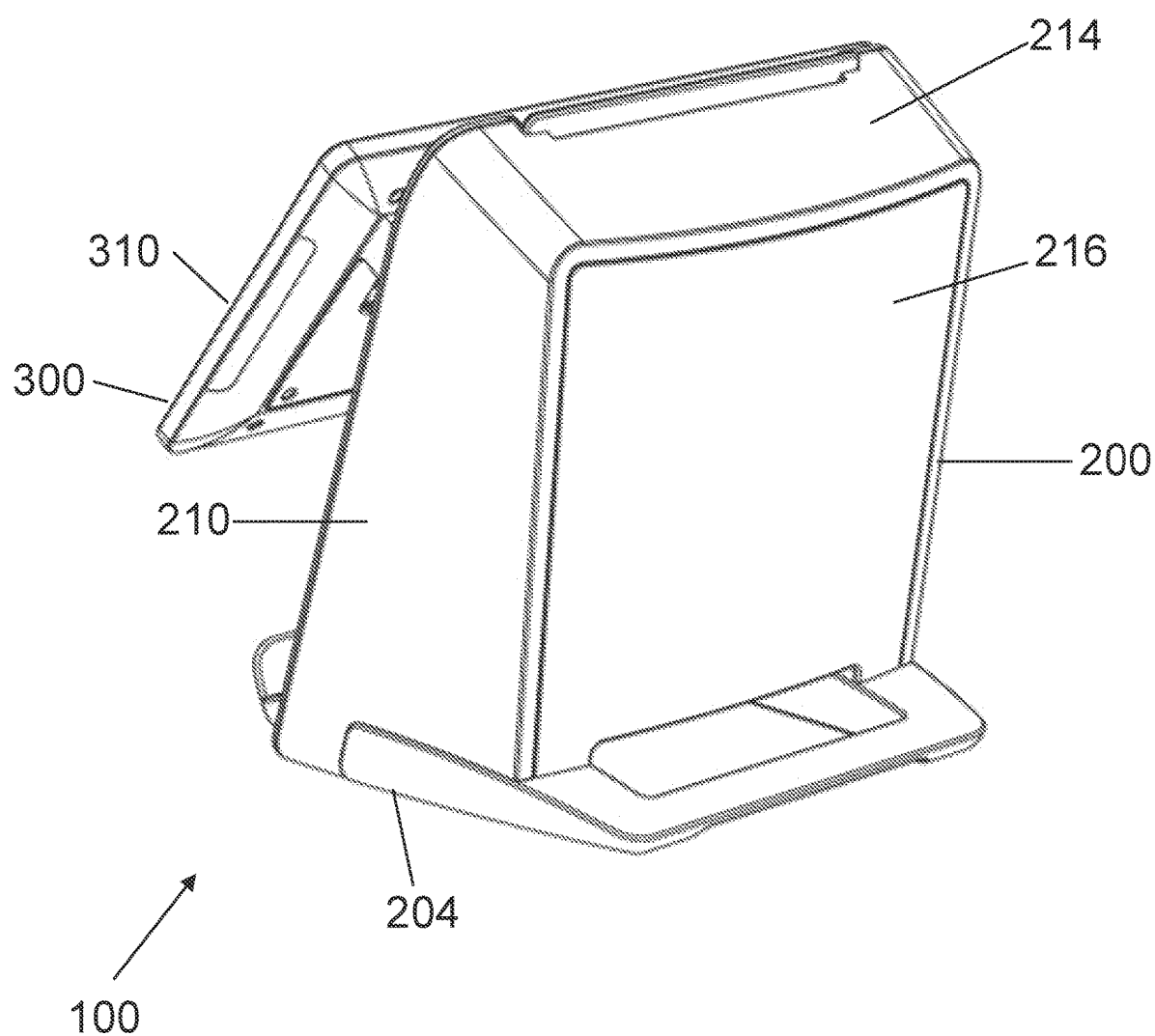
FIG. 2A is a rear perspective view of the lottery terminal of FIG. 1, wherein the display device is in a partially open position and the scanner holder is in the closed position.
Figure 2B:
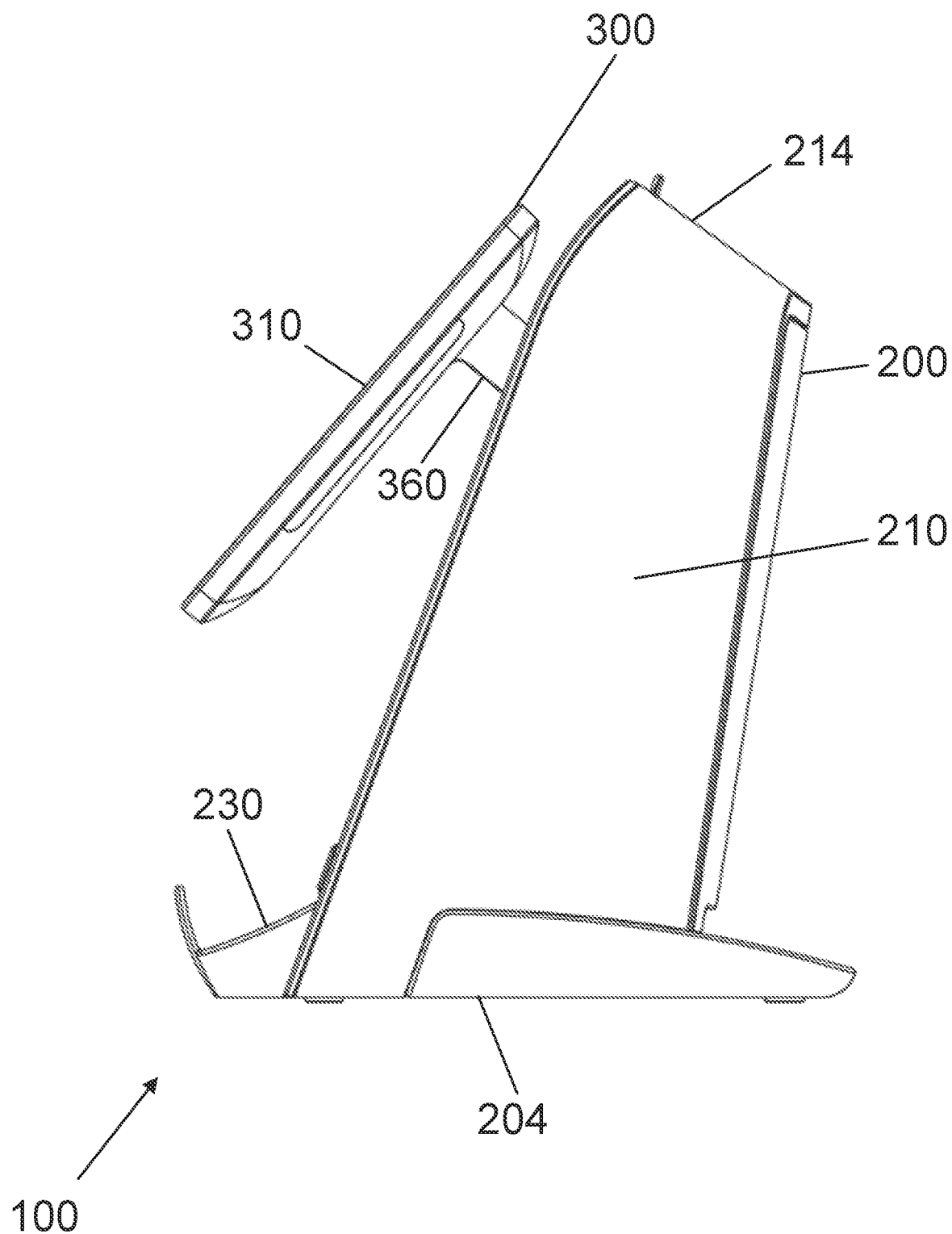
FIG. 2B is a side view of the lottery terminal of FIG. 1, wherein the display device is in a partially open position and the scanner holder is in the closed position.
Figure 2C:
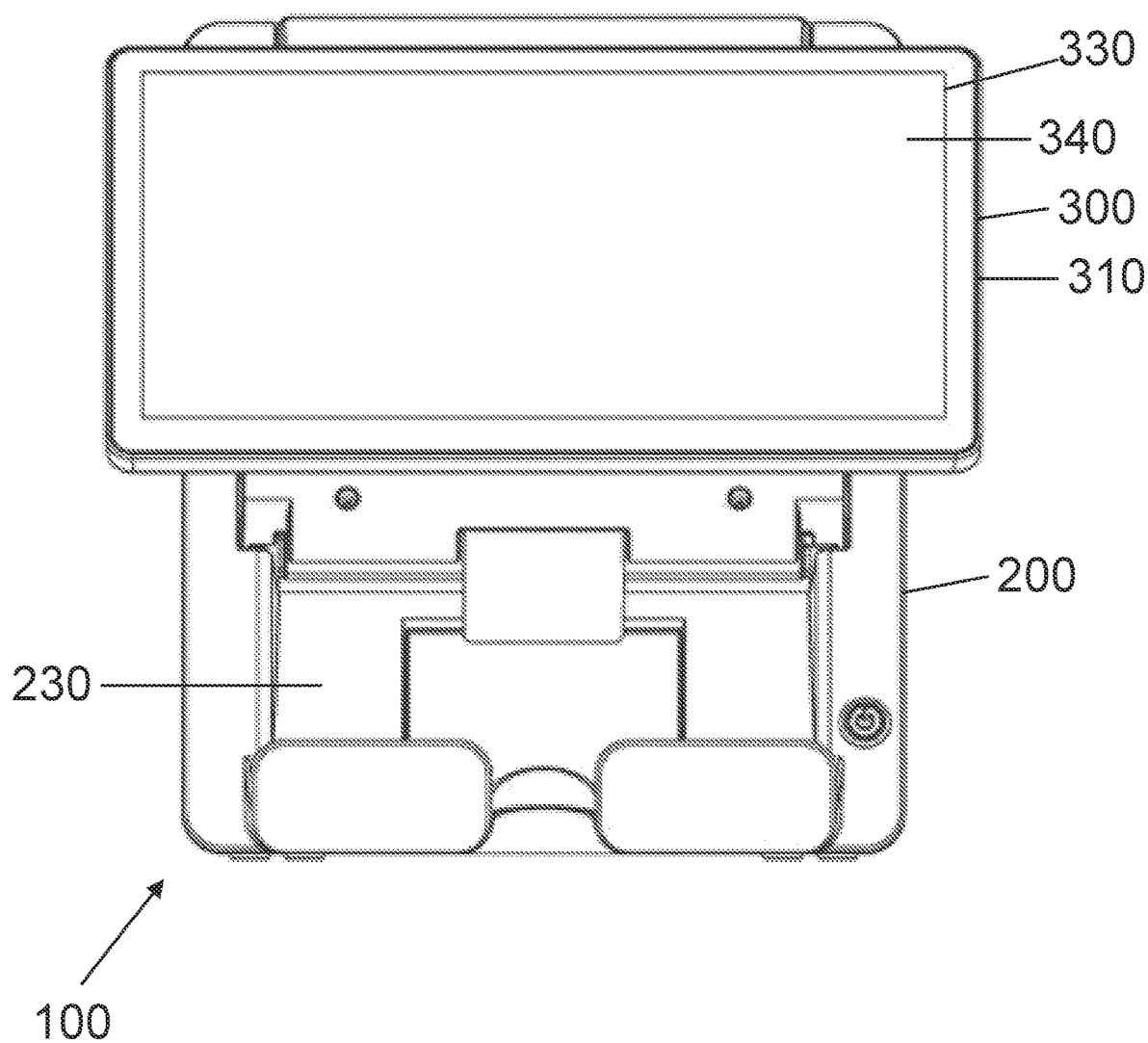
FIG. 2C is a front view of the lottery terminal of FIG. 1, wherein the display device is in a partially open position and the scanner holder is in the closed position.
Figure 2D:
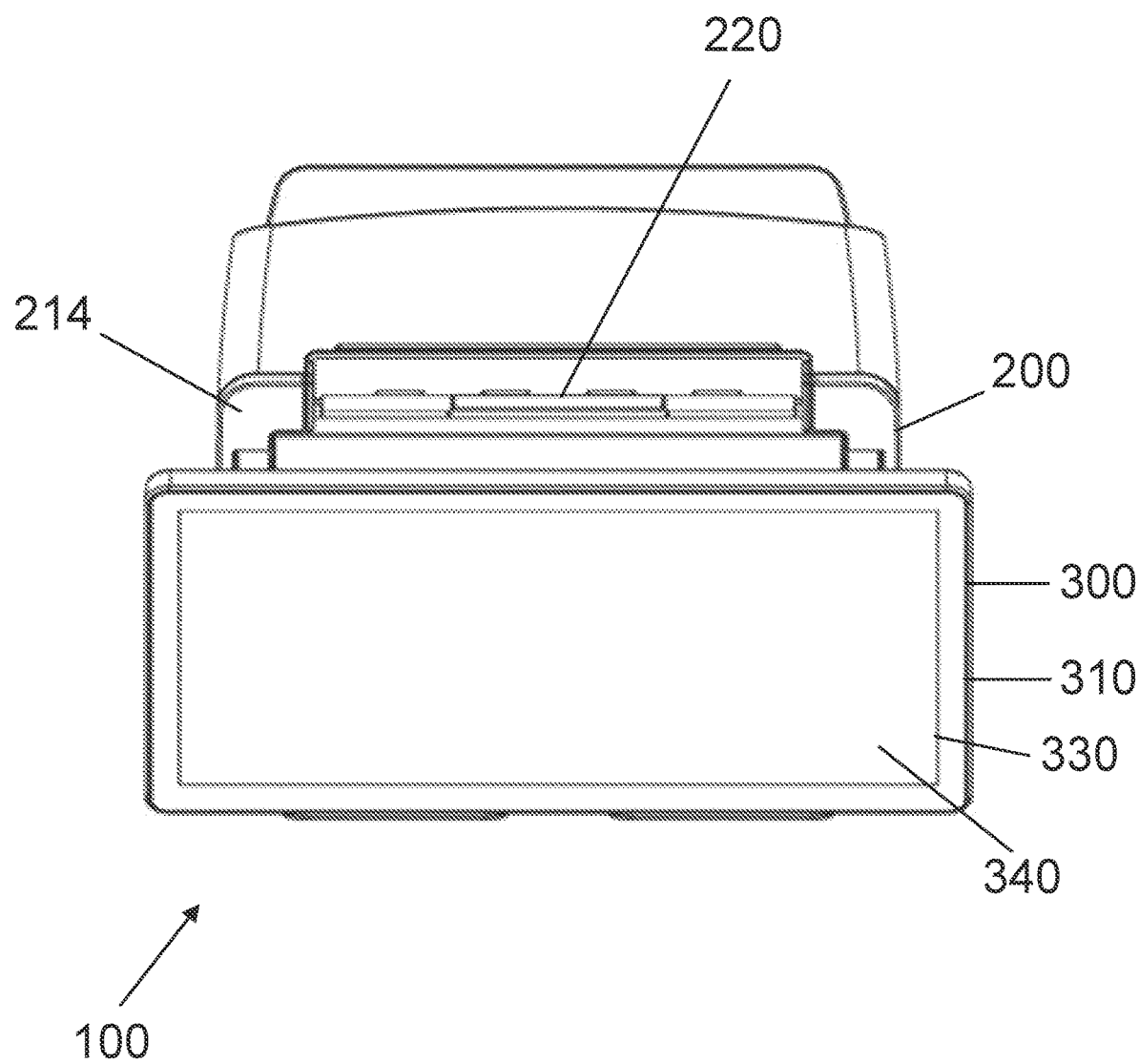
FIG. 2D is a top view of the lottery terminal of FIG. 1, wherein the display device is in a partially open position and the scanner holder is in the closed position.
Figure 2E:
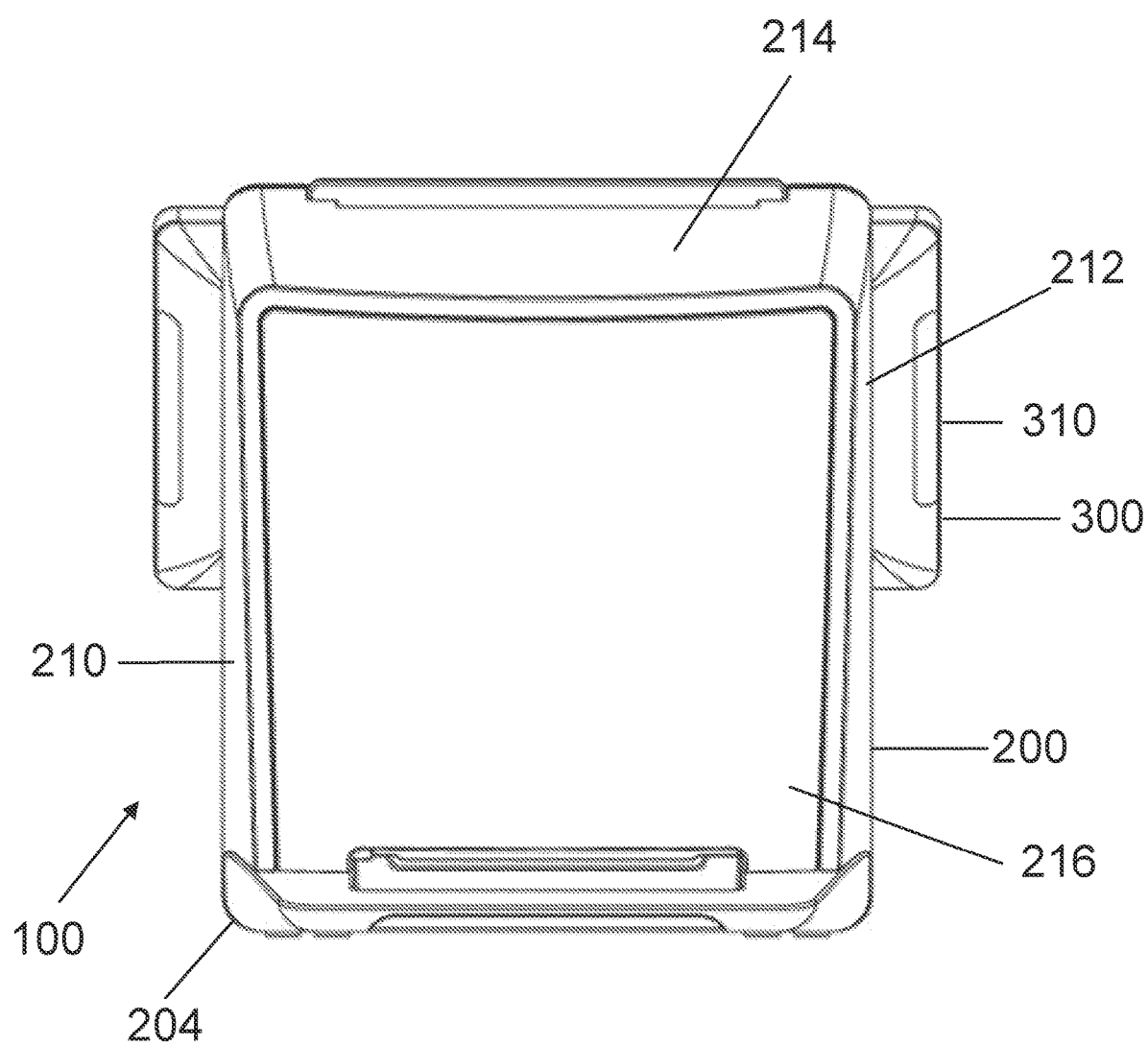
FIG. 2E is a rear view of the lottery terminal of FIG. 1, wherein the display device is in a partially open position and the scanner holder is in the closed position.

In various embodiments, the present disclosure relates generally to a lottery terminal having a lottery ticket play slip reader configured to provide full, quick, and easy access to its scanner for cleaning purposes and for paper jam clearing.

FIGS. 1 to 5 illustrate a lottery terminal with an internal lottery ticket play slip reader of one example embodiment of the present disclosure, wherein the lottery terminal is generally indicated by numeral 100 and the lottery ticket play slip reader is generally indicated by numeral 150. For brevity, the example lottery ticket play slip reader 150 may be referred to herein as "the play slip reader" or simply as "the reader" without limiting the present disclosure. This illustrated example lottery terminal 100 generally includes: (1) a housing 200; (2) the play slip reader 150 supported by the housing 200; and (3) a display device 300 pivotally connected to the housing 200. The play slip reader 150 generally includes: (4) a scanner holder 400 pivotally supported by the housing 200; (5) a scanner 500 supported by the scanner holder 400; and (6) a document mover 600 connected to the housing 200. The lottery terminal 100 can also include (7) a controller (not shown); (8) a power supply such as an external power supply (not shown); and (9) various other suitable components (not shown) that facilitate the operation of the lottery terminal 100 including the play reader 150. In various embodiments, the lottery terminal 100 can additionally include one or more code readers (not shown) such as a barcode reader and/or a QR code reader that enable(s) the lottery terminal 100 to additionally read codes such as bar codes or QR codes on lottery tickets (such as on draw lottery tickets or instant lottery tickets).

Figure 3:
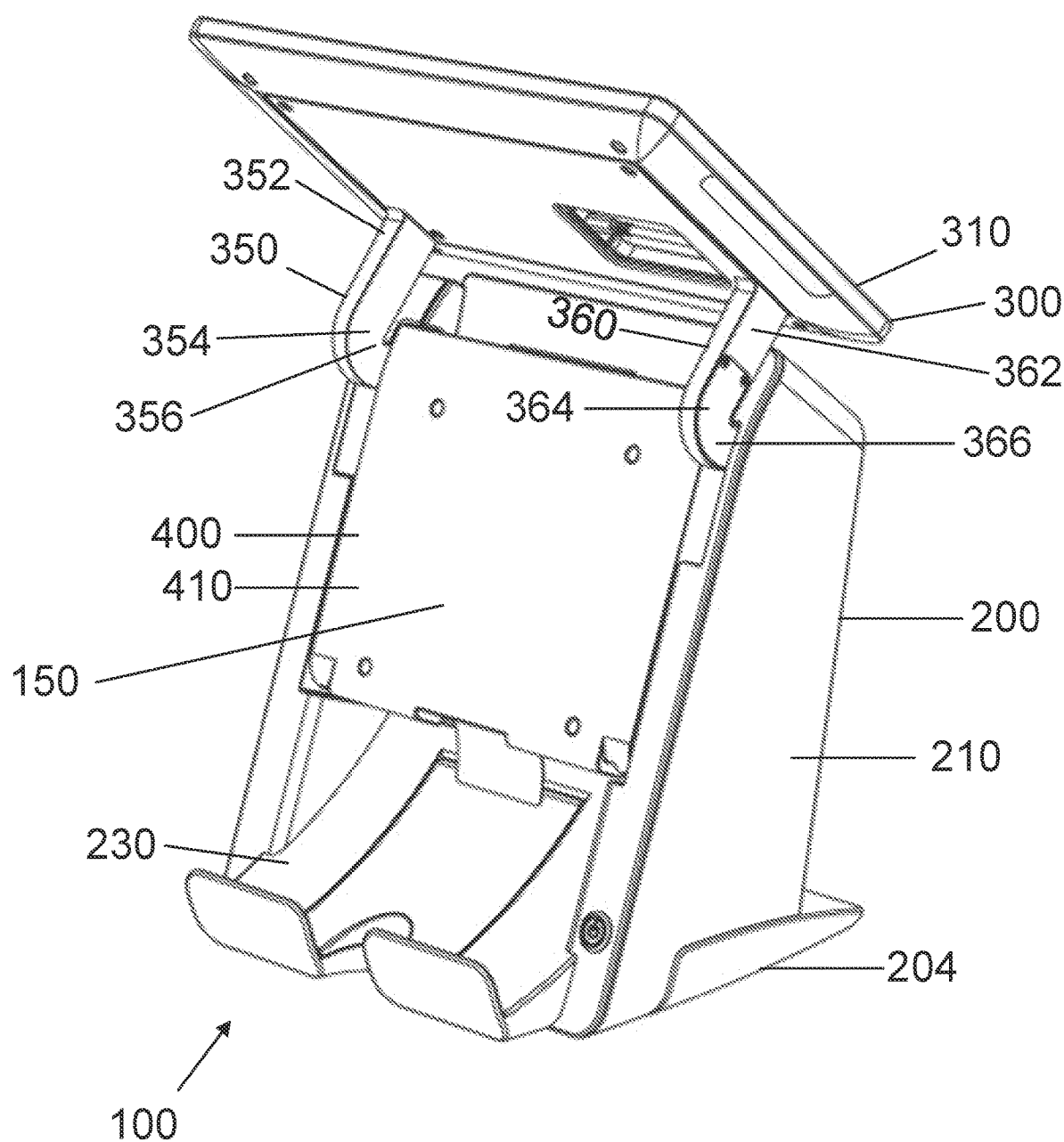
FIG. 3 is a front perspective view of the lottery terminal of FIG. 1, wherein the display device is in a fully open position and the scanner holder is in the closed position.
Figure 3A:
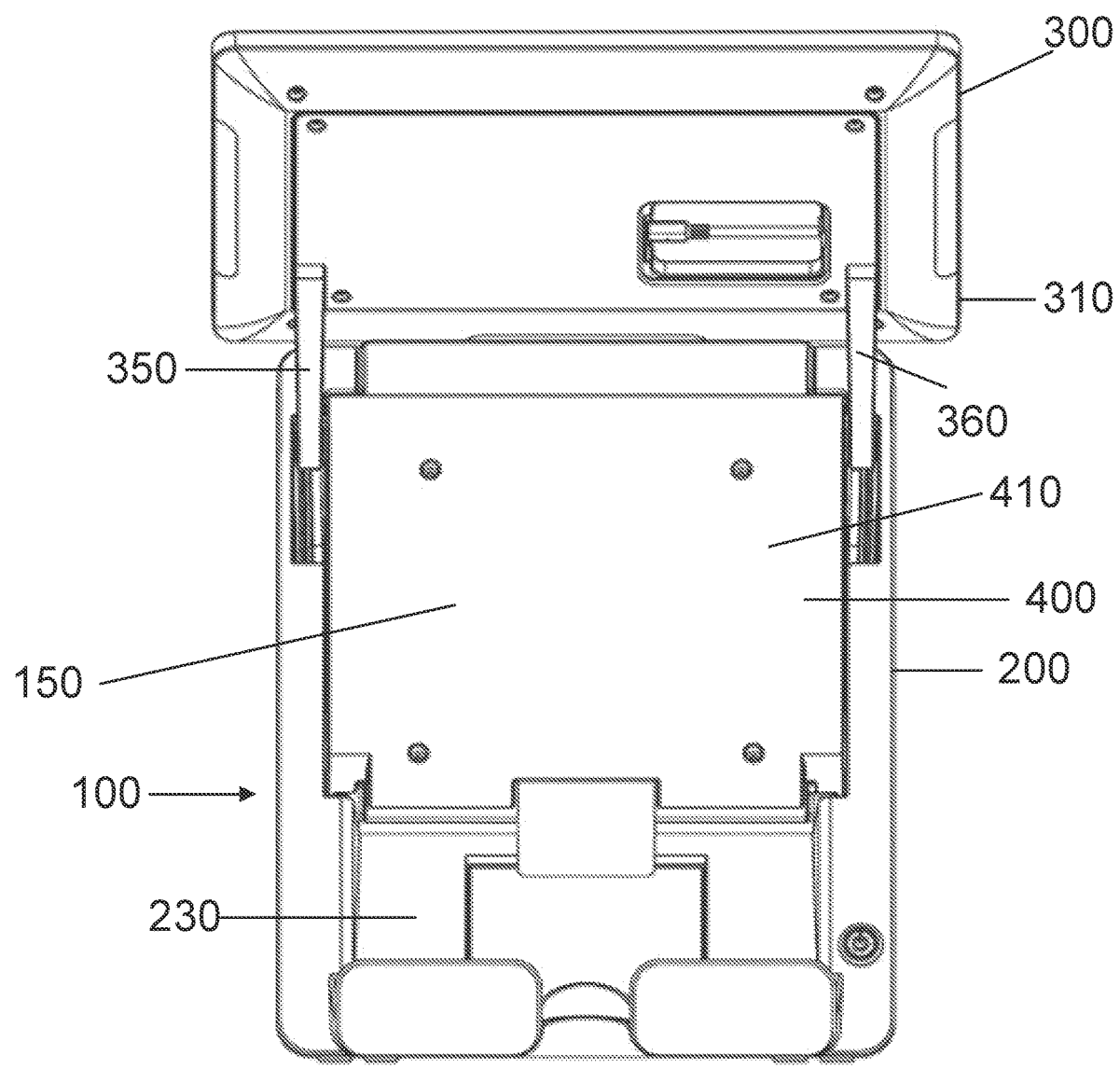
FIG. 3A is a front view of the lottery terminal of FIG. 1, wherein the display device is in a fully open position and the scanner holder is in the closed position.
Figure 3B:
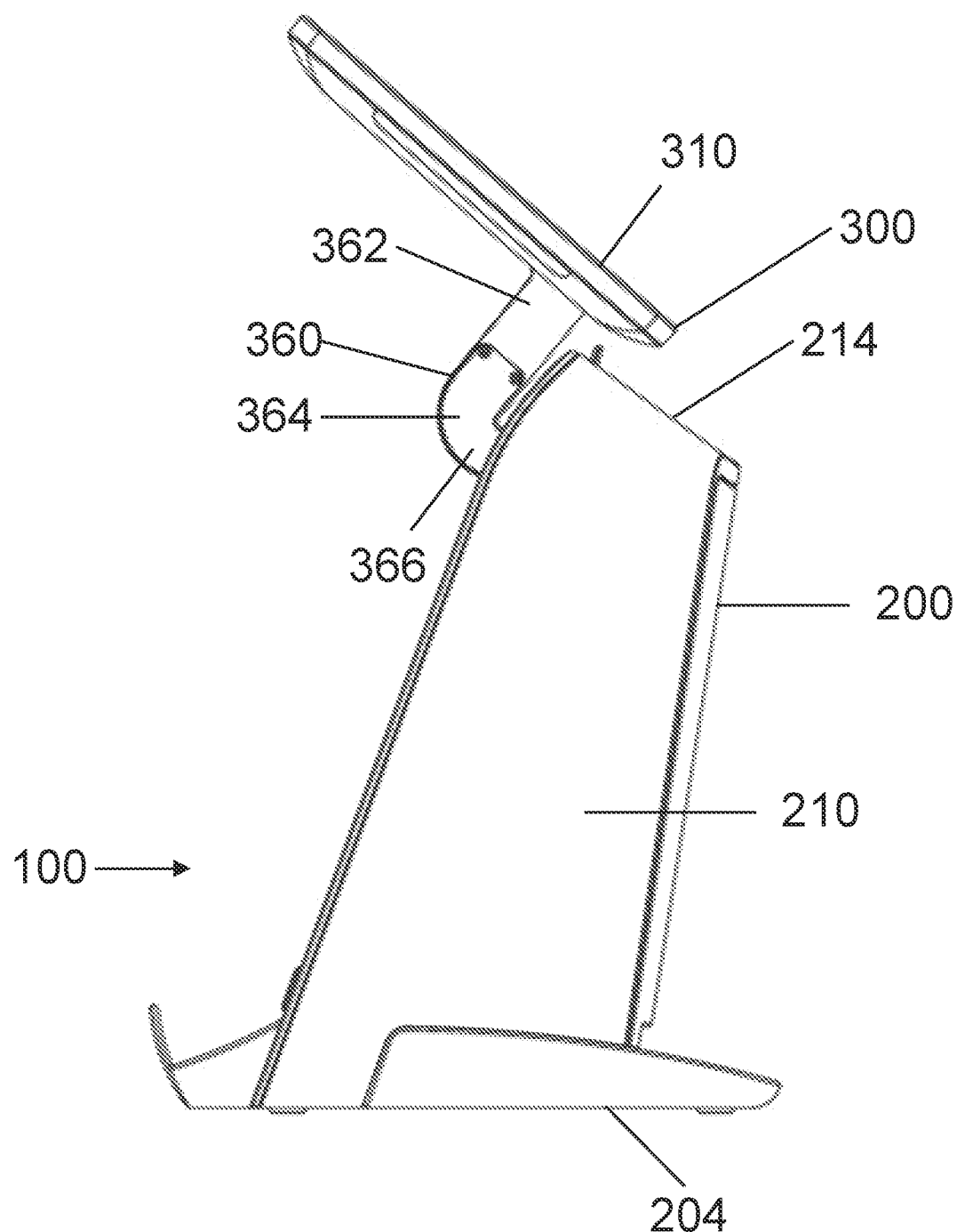
FIG. 3B is a side view of the lottery terminal of FIG. 1, wherein the display device is in a fully open position and the scanner holder is in the closed position.
Figure 3C:
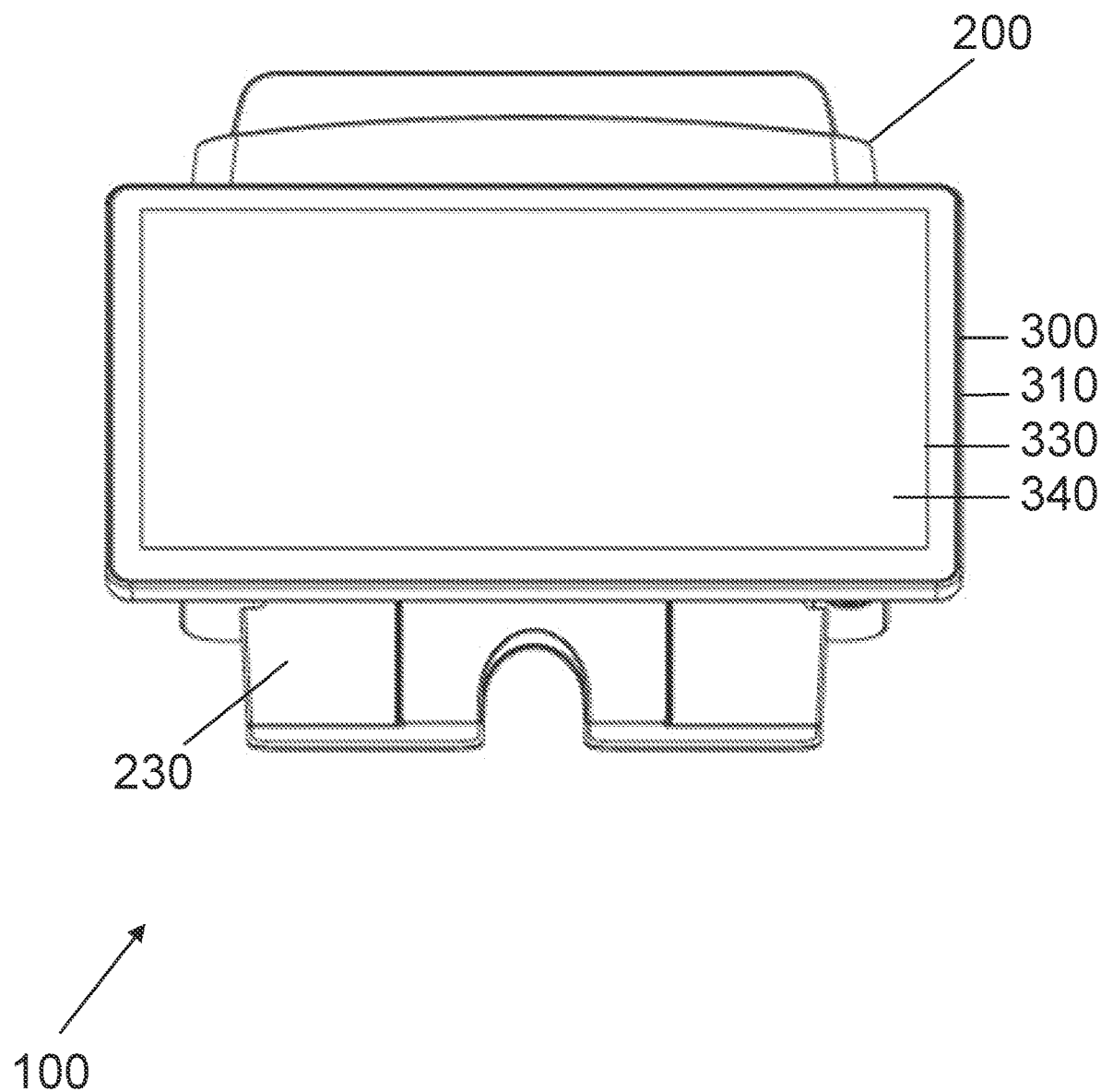
FIG. 3C is a top view of the lottery terminal of FIG. 1, wherein the display device is in a fully open position and the scanner holder is in the closed position.
Figure 3D:
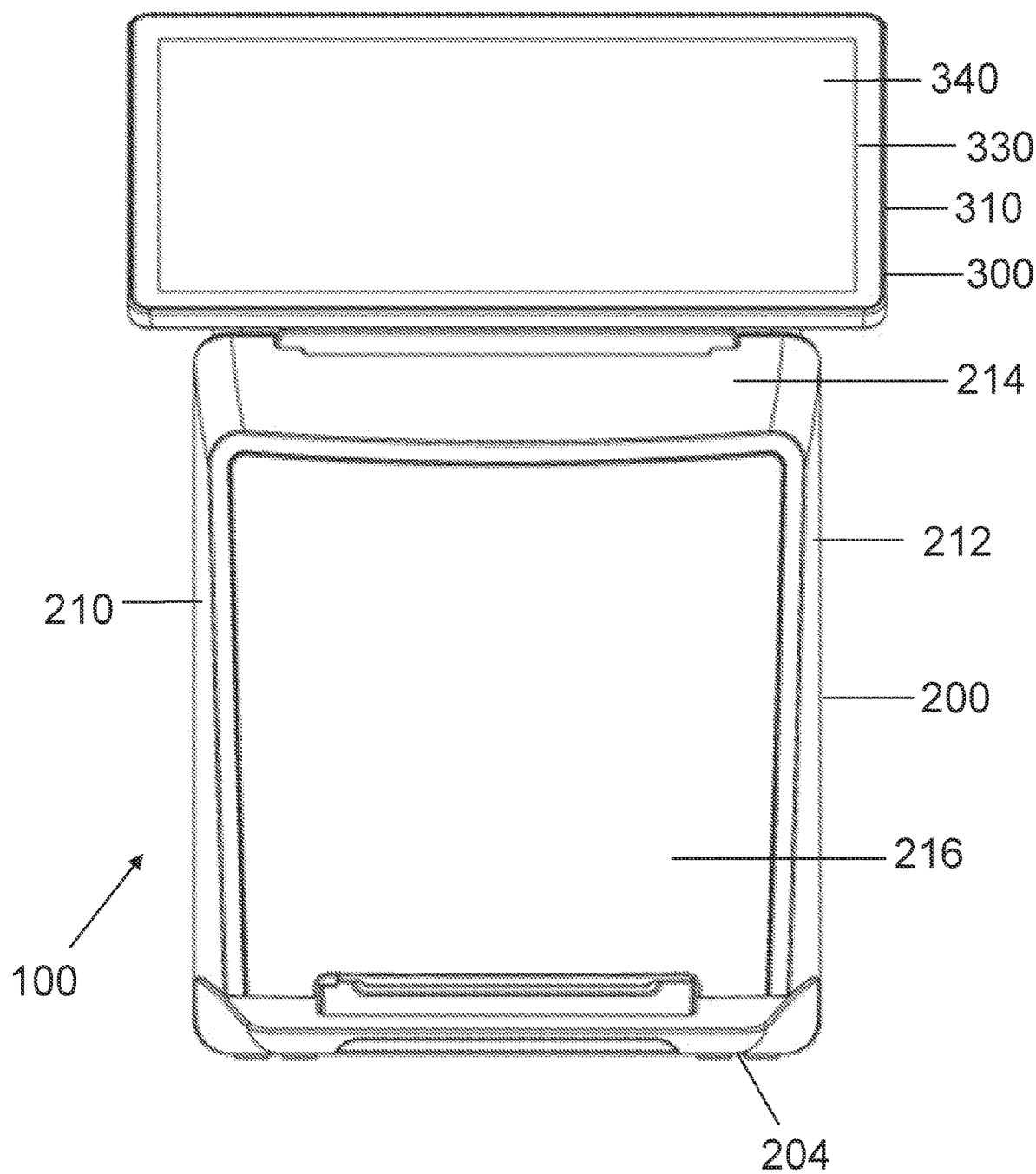
FIG. 3D is a rear view of the lottery terminal of FIG. 1, wherein the display device is in a fully open position and the scanner holder is in the closed position.

The display device 300 can include an LCD display and associated touch screen, or other suitable display and input mechanism. The display device 300 is upwardly pivotal from: (A) a fully closed position shown in FIGS. 1, 1A, 1B, 1C, and 1D; to (B) a partially open positions such as the partially open position shown in FIGS. 2, 2A, 2B, 2C, 2D, and 2E; to (C) a fully open position shown in FIGS. 3, 3A, 3B, 3C, 3D, 4, 4A, 4B, 4C, 4D, 4E, 4F, and 5. The scanner holder 400 is downwardly pivotal from: (A) a fully closed position best shown in FIGS. 3 and 3A, to (B) a fully open position best shown in FIGS. 4, 4A, 4B, 4C, 4D, 4E, and 4F. The display device 300 is easily and quickly moveable from its fully closed position to its fully open position, and thereafter the scanner holder 400 is easily and quickly moveable from its fully closed position to its fully open position. When the display device 300 and the scanner holder 400 are both in their respective fully open positions, they enable full and easy access to the scanner 500 to enable an operator to clean front surface of the scanner 500 and to clear paper jams. In this example embodiment, the lottery terminal 100 does not include any unlockable locking mechanisms or latches for the display device 300 or for the scanner holder 400 that need to be actuated to pivot the display device 300 or to pivot the scanner holder 400. Rather, in various embodiments, gravity is employed to hold the display device 300 in the fully closed position, and magnets are employed to hold the scanner holder 400 in the fully closed position.

More specifically, the housing 200 includes or defines: (1) a frame 202; (2) a document inlet 220 connected to and supported by the frame 202; (3) a document outlet 230 connected to and supported by the frame 202; (4) display device supporters 240 and 250 (numbered but not shown) connected to and supported by the frame 202; and (5) suitable document mover supporters (not shown) connected to and supported by the frame 202. The housing 200 can be otherwise configured in accordance with the present disclosure. The housing 200 can be made from any suitable materials in accordance with the present disclosure.

The frame 202 includes: (1) a base 204; (2) a first side wall 210 connected to and extending upwardly from the base 204; (3) a second side wall 212 connected to and extending upwardly from the base 204 and spaced apart from the first side wall 210; (4) a top wall 214 connected to the first side wall 210 and the second side wall 212; and (5) a rear wall 216 connected to the first side wall 210, the second side wall 212, and the top wall 214. The frame 202 can be otherwise configured in accordance with the present disclosure. The frame 202 can be made from any suitable materials in accordance with the present disclosure.

The document inlet 220 is defined by parts of the frame 202, the document mover 600, and the scanner holder 400. The document inlet 220 is configured such that a lottery ticket play slip can be inserted into the document inlet 220 and then subsequently engaged by and moved by the document mover 600 pass the scanner 500 and into the document outlet 230. The document inlet can be otherwise configured in accordance with the present disclosure. The document inlet can be made from any suitable materials in accordance with the present disclosure.

The document outlet 230 includes suitable document supporters (not labeled) configured to receive each lottery ticket play slip after the lottery ticket play slip has been moved by the document mover 600 pass the scanner 500 (and thus after the scanner 500 has scanned that lottery ticket play slip). The document outlet can be otherwise configured in accordance with the present disclosure. The document outlet can be made from any suitable materials in accordance with the present disclosure.

Figure 5:
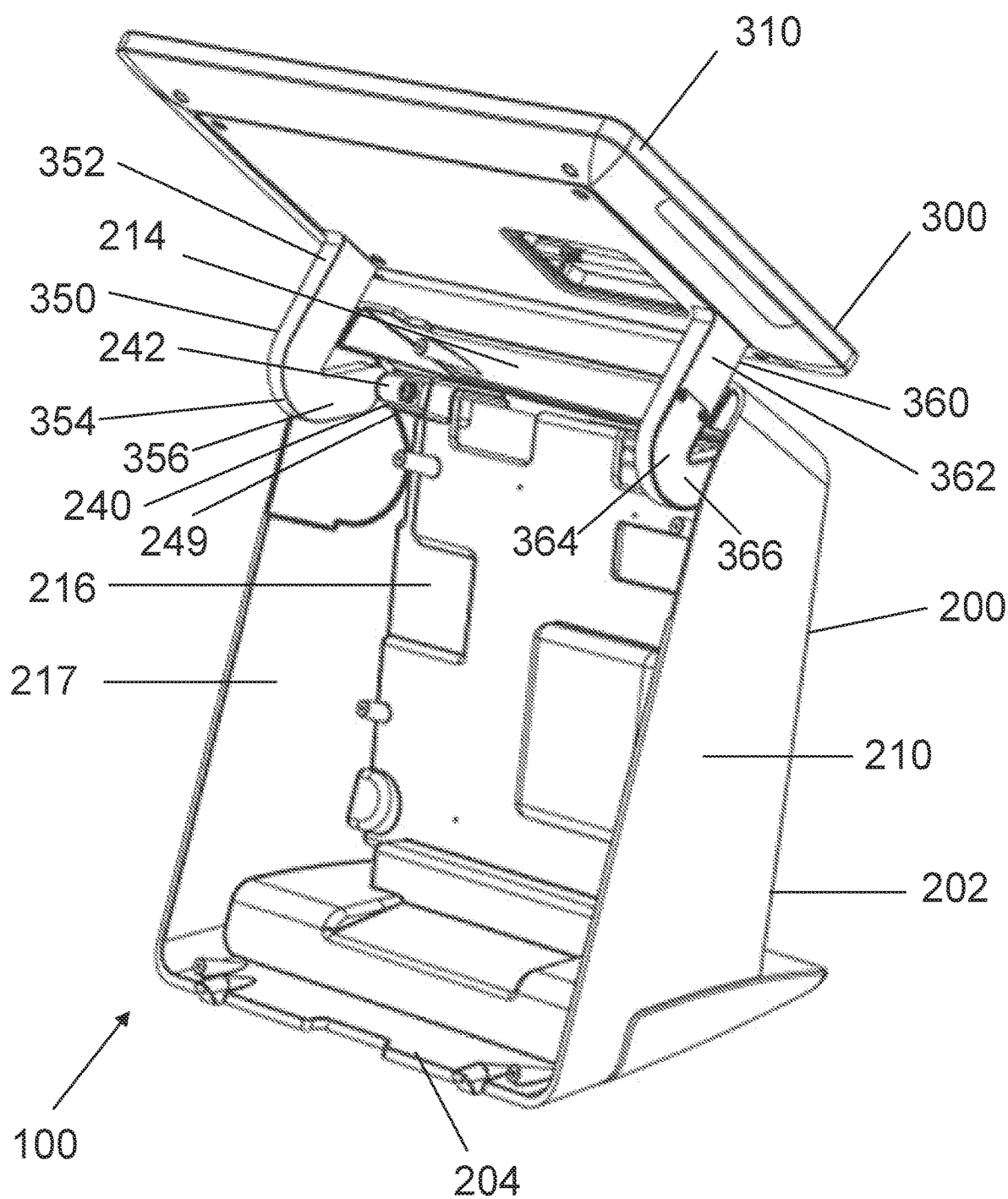
FIG. 5 is a front perspective view of the lottery terminal of FIG. 1, wherein the display device is in a fully open position, and the play slip reader is removed.

The display device supporters 240 and 250 inwardly extend from the rear wall 216 of the frame 202 and are configured to pivotally support the display device 300. The display device supporters 240 and 250 are mirror images of each other, and thus for brevity, only display device supporter 240 is described herein. As best shown in FIG. 5, the display device supporter 240 is connected to and extends inwardly from the inside surface of the rear wall 216 of the frame 202. The display device supporter 240 includes a bracket 241 connected to and inwardly extending from the rear wall 216 of the frame 202 and a fastener receiver and particularly a friction hinge 242 at connected to the end of the backet 241 opposite the rear wall 216. The friction hinge 242 extends along and partially defines a display device pivot axis for the display device 300. The friction hinge 242 is configured to receive a fastener (not labeled) that is connected to the arm of the display device 300 as further described below. The display device supporters 240 and 250 can be configured in any suitable manner that enables the pivot of the display device 300 as described herein and in accordance with the present disclosure. The display device supporters can be made from any suitable materials in accordance with the present disclosure.

The document mover supporters extends from the top wall 214 of the frame 202 and are configured to support the document mover 600. The document mover supporters can be configured in any suitable manner in accordance with the present disclosure. The document mover supports can be made from any suitable materials in accordance with the present disclosure.

The display device 300 includes: (1) a display device frame 310; (2) a display screen 330 supported by the display device frame 310; (3) a touch screen 340 supported by the display device frame 310 in front of and associated with the display screen 330; and (4) various other suitable components (not shown) that facilitate the operation of the display device 300. The touch screen 340 is configured to receive operator inputs such as in a conventional manner. The display device 300 is thus configured to provide an operator interface. The display device 300 and particularly the display screen 330 and the touch screen 340 are communicatively connected to the controller to send signals to the controller and to receive signals from the controller.

The display device 300 additionally includes a first pivot arm 350 connected to and extending from a first side of the display device frame 310 and a second pivot arm 360 connected to and extending from a second side of the display device frame 310. The configurations of the first pivot arm 350 and the second pivot arm 360, the attachment points to the display device frame 310, and their pivotable attachments to the display device supporters 240 and 250 enable the pivoting of the display device 300 relative to the housing 200 as shown and described herein.

More specifically, the first pivot arm 350 is generally J-shaped and includes a first section 352 fixedly connected to the display device frame 310, a second section 356 pivotally connected to the display device supporter 240, and a third section 354 connecting the first and second sections 352 and 356. In this illustrated example embodiment, the first and second sections 352 and 356 are substantially straight and the third section 354 is curved (and particularly U-shaped). In this illustrated example embodiment, the first section 352 is fixedly connected by a suitable fastener (not shown) to the first side of the display device frame 310. In this illustrated example embodiment, the second section 356 is pivotally connected by a suitable fastener (not labeled) to the display device supporter 240 along the display device pivot axis.

Likewise, the second pivot arm 360 is generally J-shaped and includes a first section 362 fixedly connected to the display device frame 310, a second section 366 pivotally connected to the display device supporter 250, and a third section 364 connecting the first and second sections 362 and 366. In this illustrated example embodiment, the first and second sections 362 and 366 are substantially straight and the third section 364 is curved (and particularly U-shaped). In this illustrated example embodiment, the first section 362 is fixedly connected by a suitable fastener (not shown) to the second side of the display device frame 310. In this illustrated example embodiment, the second section 366 is pivotally connected by a suitable fastener (not shown) to the display device supporter 250 along the display device pivot axis.

The first and second pivot arms 350 and 360 can be otherwise configured in accordance with the present disclosure. The first and second pivot arms can be made from any suitable materials in accordance with the present disclosure.

The display device 300 is movable upwardly pivotal from the fully closed position (shown in FIGS. 1, 1A, 1B, 1C, and 1D) to the fully open position (shown in FIGS. 3, 3A, 3B, 3C, 3D, 4, 4A, 4B, 4C, 4D, 4E, 4F, and 5) via the first pivot arm 350 and the second pivot arm 360. In the fully closed position, the display device 300 extends in front of the housing 200 in a plane that is at a 70 degree angle to a horizontal surface on which the lottery terminal 100 can rest such that the display screen 330 is viewable by an operator and such that the touch screen 340 is usable by the operator. In the fully open position, the display device 300 extends in a plane that is at a 130 degree angle to a horizontal surface on which the lottery terminal 100 can rest, and is positioned above the top wall 214 of the frame 210. The display device 300 has a 110 degree range of motion starting at 70 degrees from horizontal. In the fully open position, the display device 300 is sufficiently above the scanner holder 400 to enable full access to the scanner 500 supported by the scanner holder 400 when the scanner holder 400 is in the fully opened position. The first and second pivot arms 350 and 360 and the first and second display device supporters 240 and 250 are respectively configured such that when the display device 300 is pivoted to the fully open position, the display device 300 remains in the fully opened position until pivoted downwardly by the operator to be in its resting use position. Suitable stops or other mechanisms can be employed in the first and second pivot arms 350 and 360 arms or the frame 210 to limit the range of motion and/or to maintain the display device in the fully open position.

The scanner holder 400 includes: (1) a scanner holder frame 410; (2) a first pivot stop 450 fixedly connected to and extending from a first side of the scanner holder frame 410; (3) a second pivot stop 460 fixedly connected to and extending from a second side of the scanner holder frame 410; and (4) various other suitable components (not shown) that facilitate the operation of the scanner holder 400. The configurations of the first pivot stop 450 and the second pivot stop 460, the attachment points to the scanner holder frame 410, and their pivotable attachments to scanner holder supporters 260 (numbered but not labelled or shown) and 270 that are part of or connected to the document mover 600 to enable the pivoting of the display device 300 relative to the housing 200 as shown and described herein. In various embodiments, suitable magnets (not shown) are employed to hold the scanner holder 400 in the fully closed position.

In this illustrated example embodiment, the scanner holder supporters (not labeled) are part of the document mover 600, form the outer sides of the document mover 600, and are configured to pivotally support the scanner holder 400. The scanner holder supporters can be configured in any suitable manner in accordance with the present disclosure. The scanner holder supporters can be made from any suitable materials in accordance with the present disclosure.

The first pivot stop 450 is curved and includes a first section (not labeled) fixedly connected to the first side of the scanner holder frame 410, a second section (not labeled); and a third section (not labeled) connecting the first and second sections. In this illustrated example embodiment, the first section is fixedly connected by a suitable fastener (not shown) to the first side of the scanner holder frame 410. In this illustrated example embodiment, the second and third sections 454 and 456 are slidably connected to the document mover 600 and particularly to the scanner holder supporter 260 connected to or that is part of the document mover 600, and more particularly on a pin (not shown) connected to and transversely extending from the document mover 600 or scanner holder supporter 260 thereof or attached thereto.

Likewise, the second pivot stop 460 is curved and includes a first section (not labeled) fixedly connected to the scanner holder frame 410, a second section (not labeled), and a third section (not labeled) connecting the first and second sections. In this illustrated example embodiment, the first section is connected by a suitable fastener (not shown) to the second side of the scanner holder frame 410. In this illustrated example embodiment, the second and third sections are slidably connected to the frame 202 and particularly to the scanner holder supporter 260 connected to or that is part of the document mover 600, and more particularly on a pin (not shown) connected to and transversely extending from the document mover 600 or scanner holder supporter 260 thereof or attached thereto.

The first and second pivot stops 450 and 460 can be otherwise configured in accordance with the present disclosure. The first and second pivot stops can be made from any suitable materials in accordance with the present disclosure.

The scanner holder 400 is downwardly pivotal from the fully closed position (best shown in FIGS. 3 and 3A) to the fully open position best (shown in FIGS. 4, 4A, 4B, 4C, 4D, 4E, and 4F) to enable access to the scanner and the associated paper play slip path. In the fully closed position (which is a scanning position), the scanner 500 can scan lottery ticket play slips that are moved by the document mover 600 pass the scanner 500. In the fully open position (which is a cleaning and jam clearing position), the scanner 500 can be fully accessed. In the fully closed position, the scanner holder 400 extends in front of the housing 200 in a plane that is at a 70 degree angle to a horizontal surface on which the lottery terminal 100 can rest such that the scanner 500 is positioned facing the document mover 600. In the fully open position, the scanner holder 400 extends in a plane that is at a 150 degree angle to a horizontal surface on which the lottery terminal 100 can rest to provide full access to the scanner 500. The range of motion of the scanner holder 400 is 80 degrees.

Figure 4:
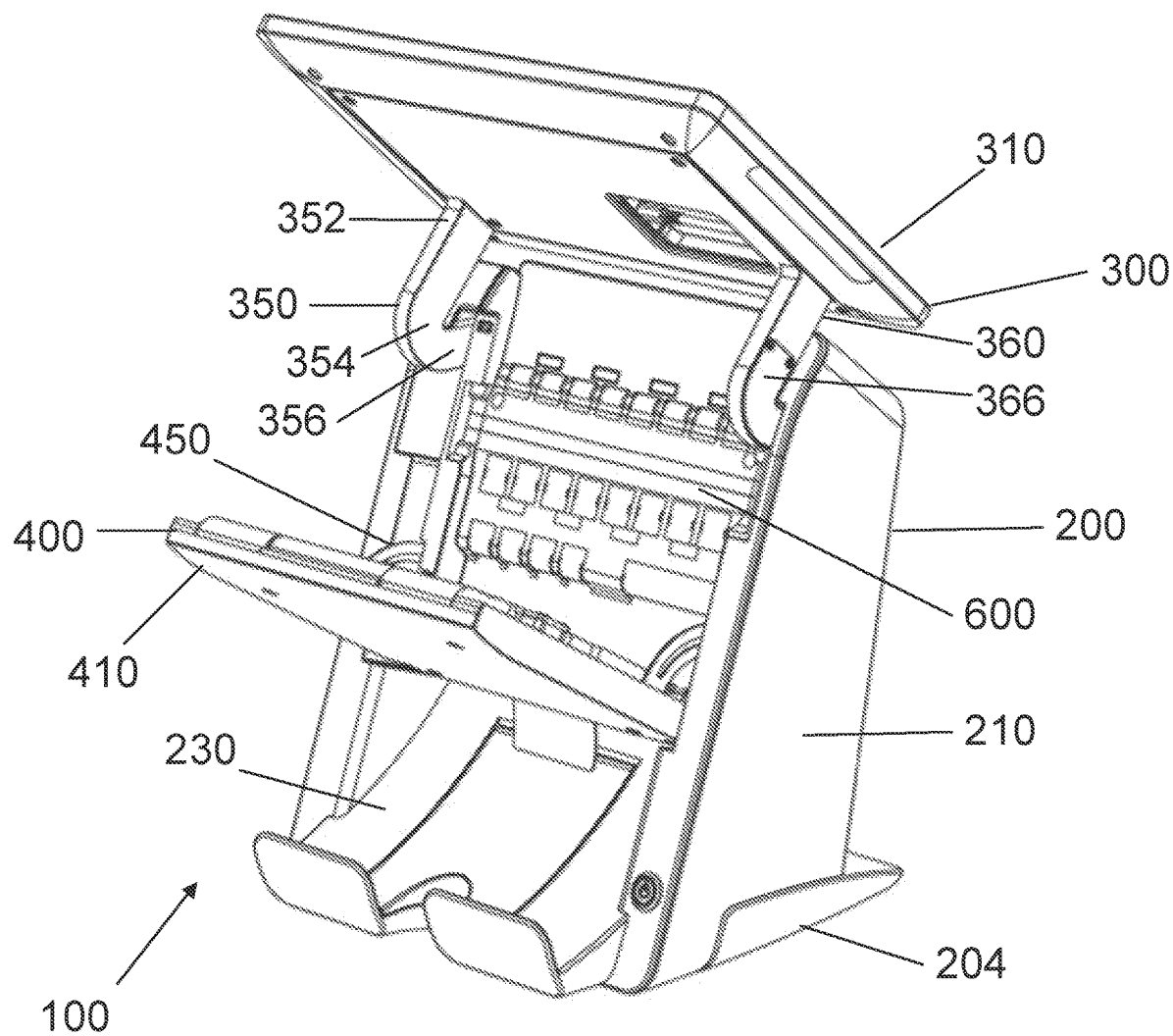
FIG. 4 is a front perspective view of the lottery terminal of FIG. 1, wherein the display device is in a fully open position and the scanner holder is in the fully open position.
Figure 4A:
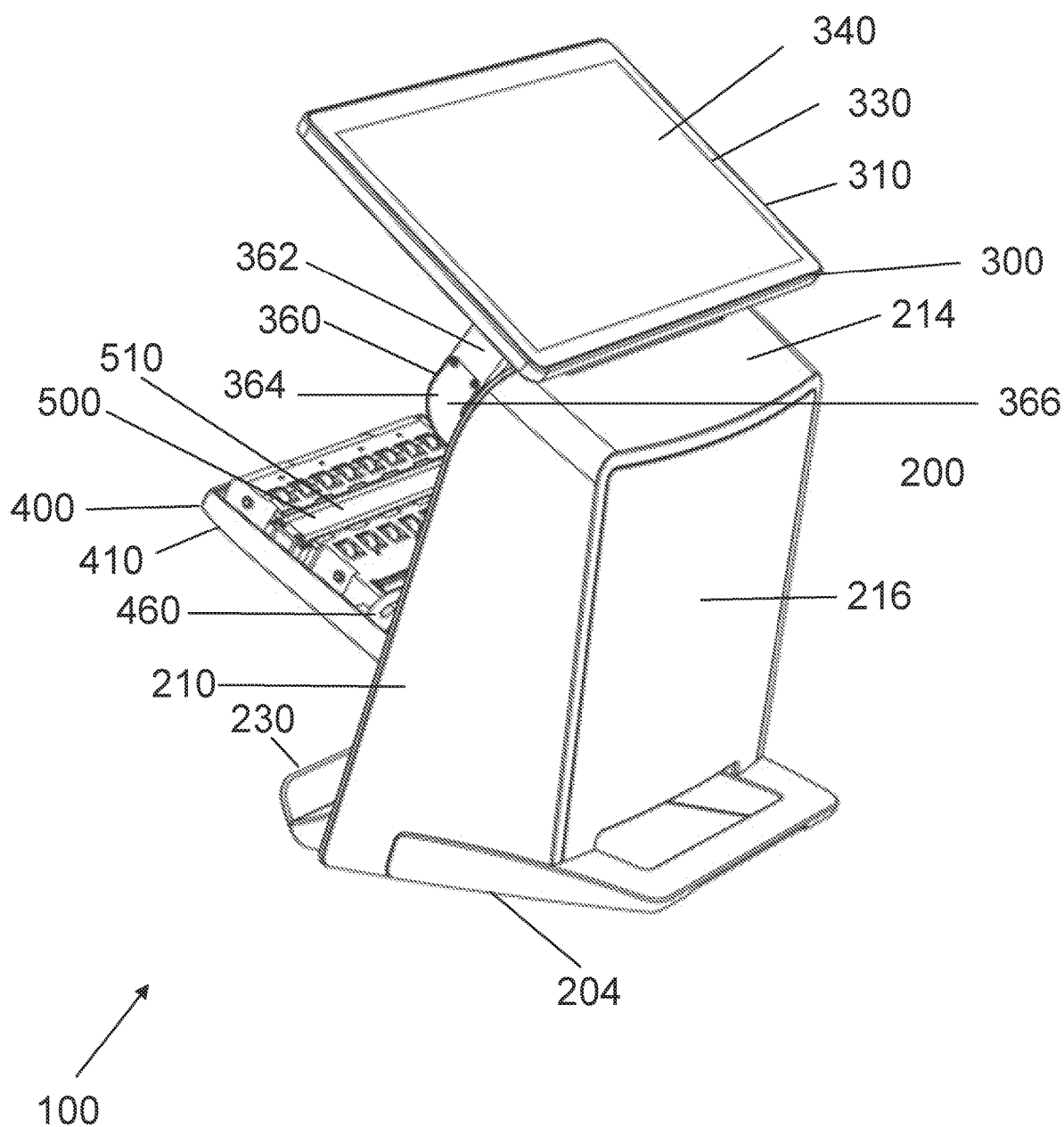
FIG. 4A is a rear perspective view of the lottery terminal of FIG. 1, wherein the display device is in a fully open position and the scanner holder is in the fully open position.
Figure 4B:
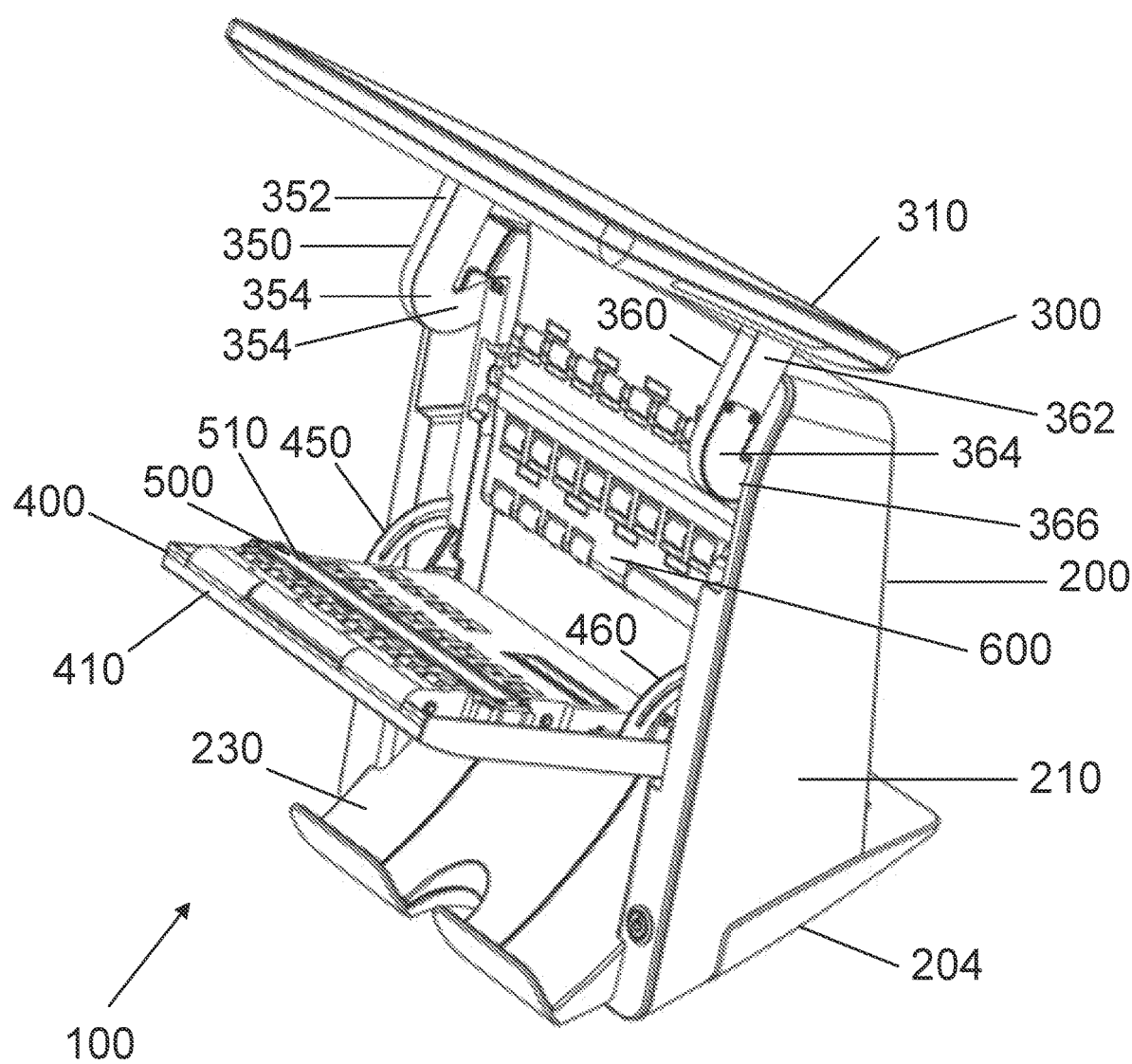
FIG. 4B is a top front perspective view of the lottery terminal of FIG. 1, wherein the display device is in a fully open position and the scanner holder is in the fully open position.
Figure 4C:
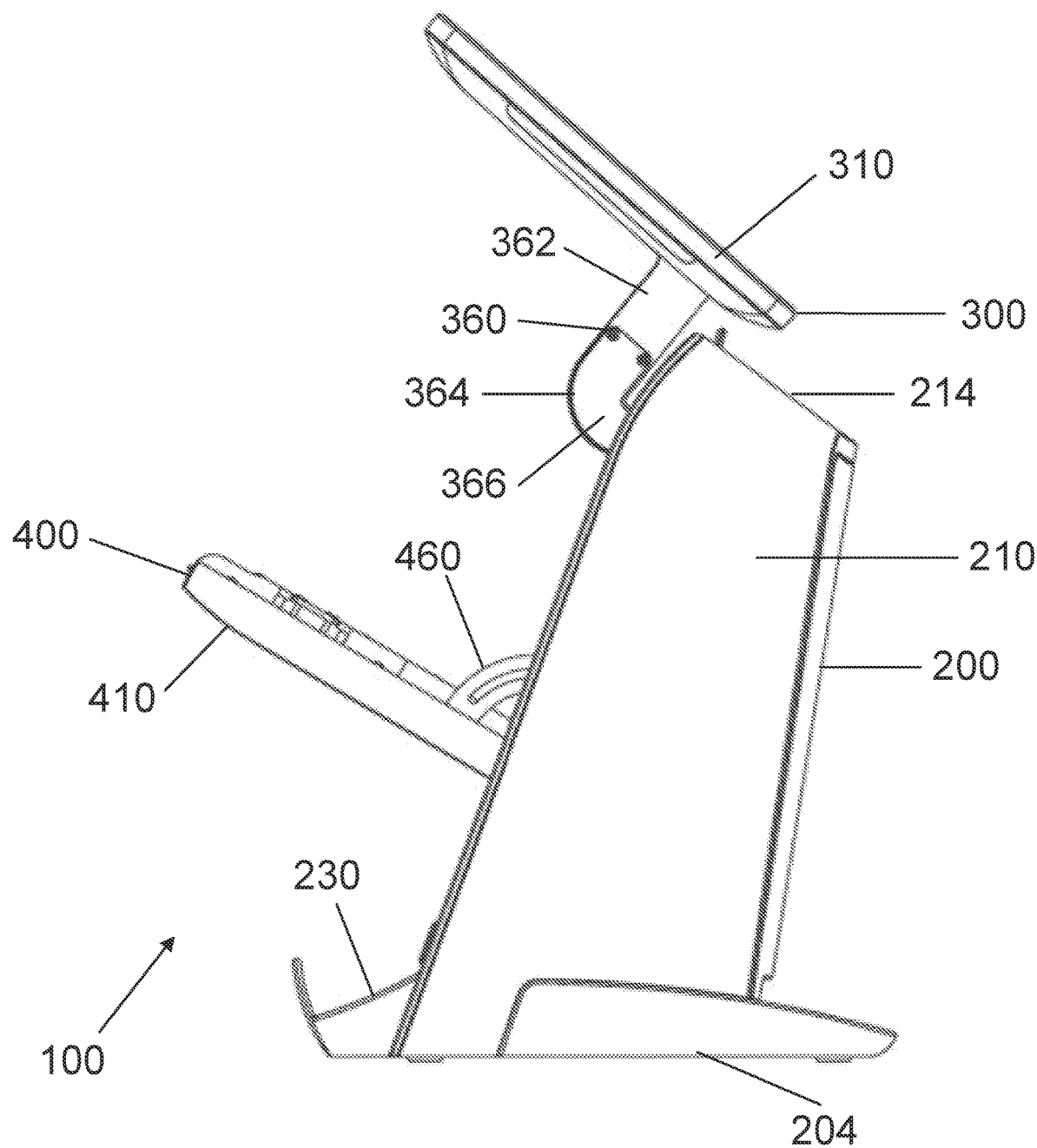
FIG. 4C is a side view of the lottery terminal of FIG. 1, wherein the display device is in a fully open position and the scanner holder is in the fully open position.
Figure 4D:
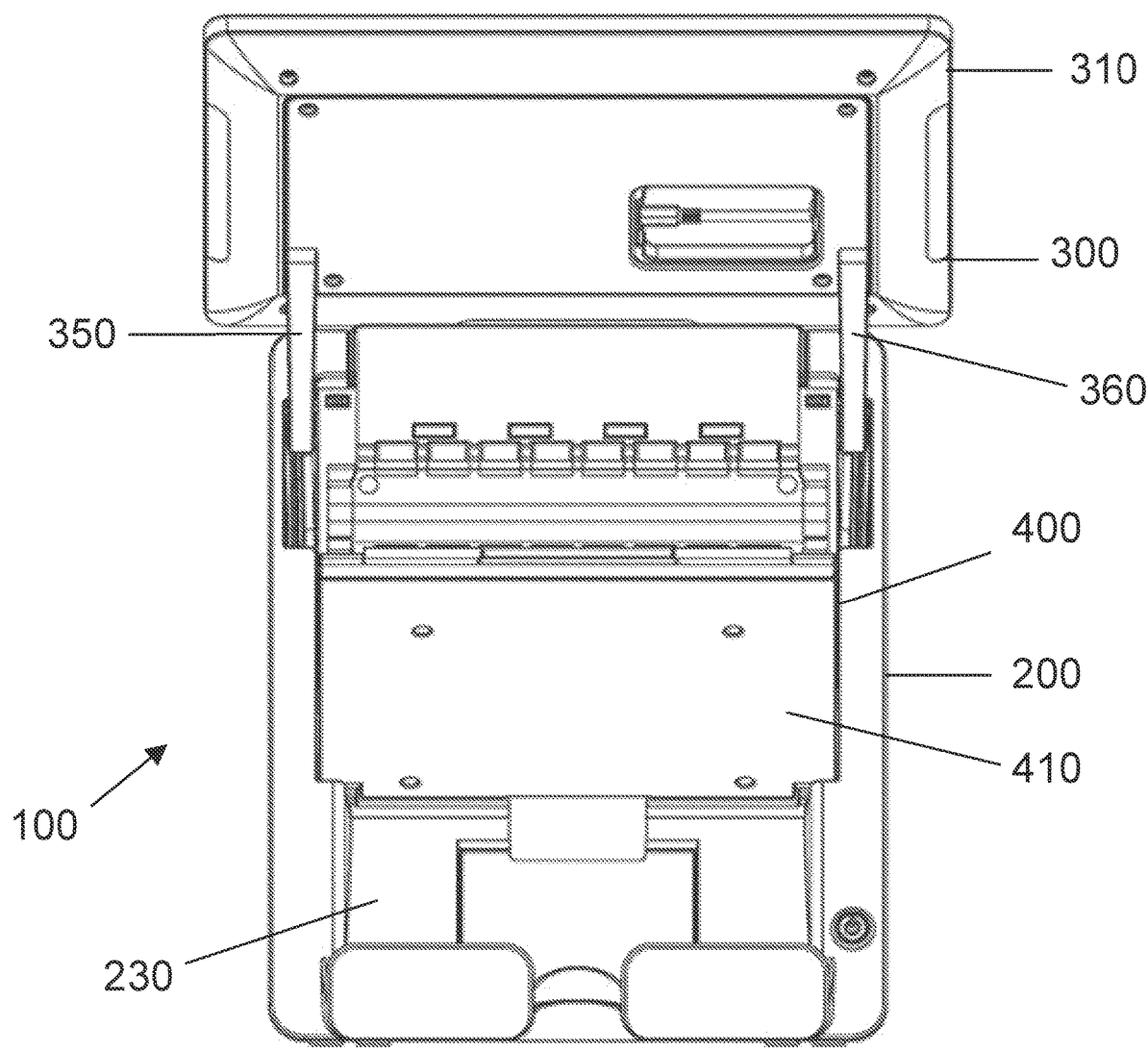
FIG. 4D is a front view of the lottery terminal of FIG. 1, wherein the display device is in a fully open position and the scanner holder is in the fully open position.
Figure 4E:
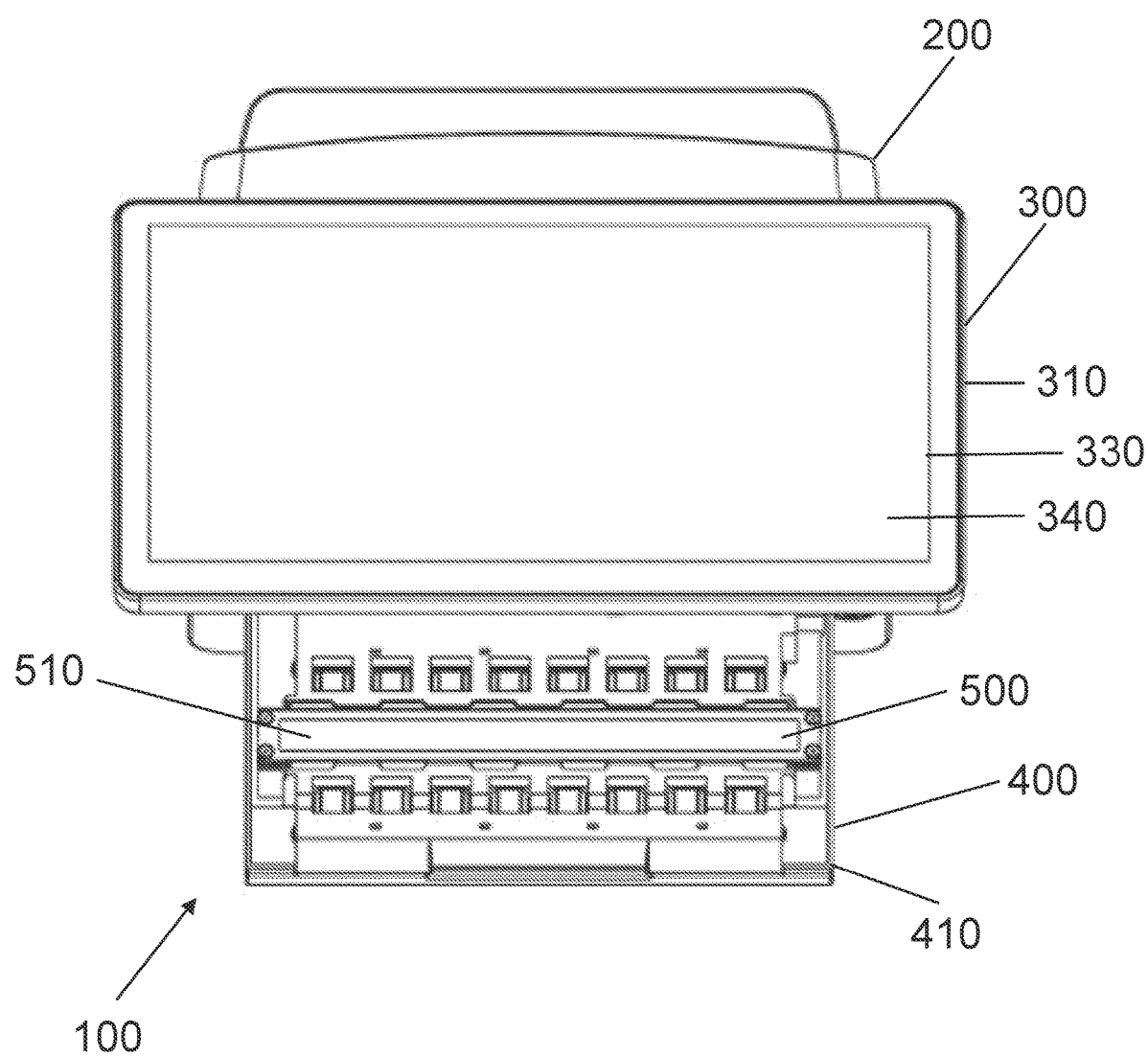
FIG. 4E is a top view of the lottery terminal of FIG. 1, wherein the display device is in a fully open position and the scanner holder is in the fully open position.
Figure 4F:
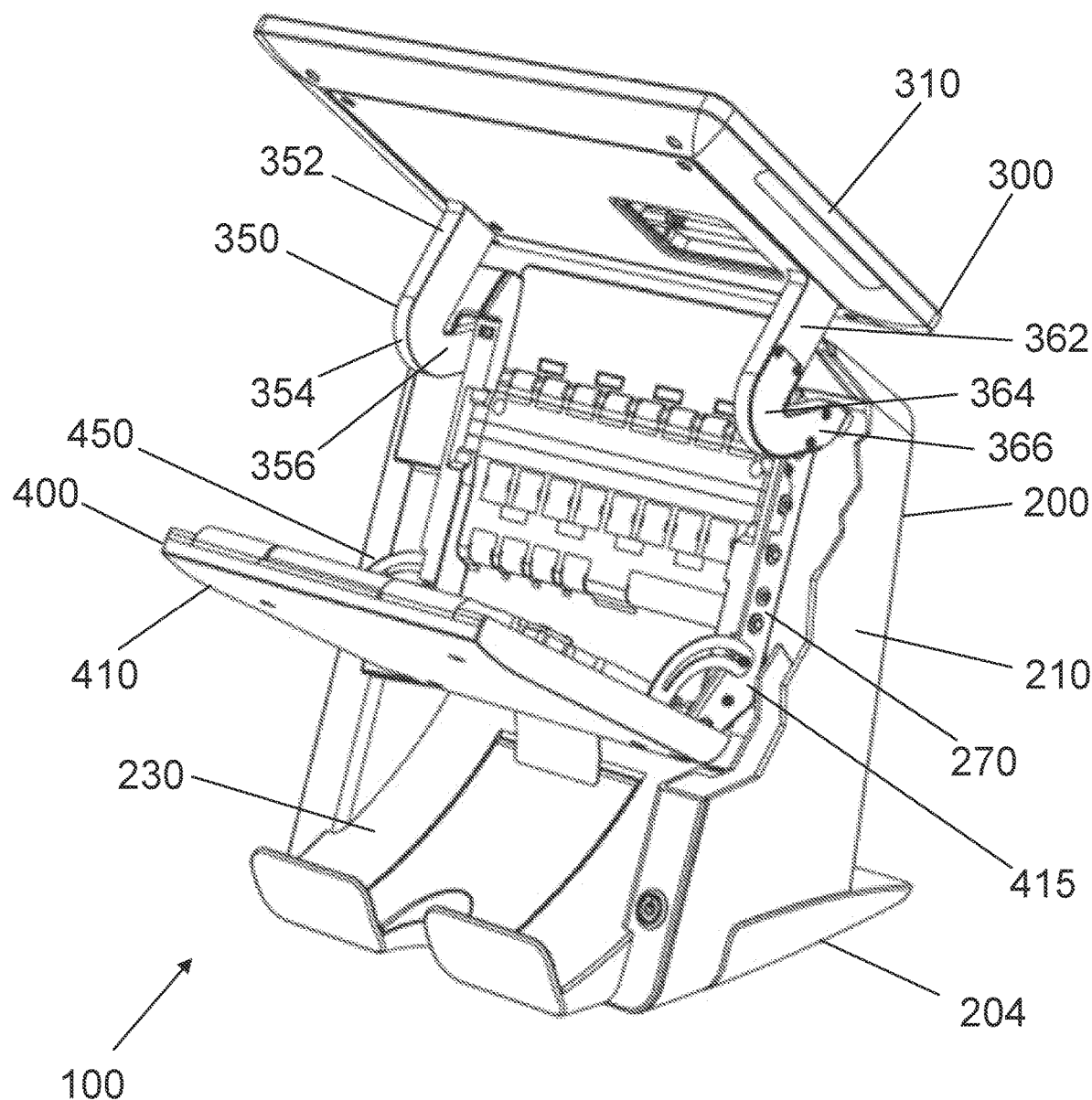
FIG. 4F is a front perspective view of the lottery terminal of FIG. 1, wherein the display device is in a fully open position and the scanner holder is in the fully open position, and wherein part of the housing is broken away to show parts of the hinge mechanisms.

In this illustrated example embodiment, as best shown in FIG. 4C, when the display device 300 and the scanner holder 400 are in their fully open positions, they extend is substantially parallel planes. In this illustrated example embodiment, as best shown in FIGS. 3, 3A, 3B, 4, 4A, 4B, and 4C, when the display device 300 is in its fully open position, the display device 300 extends above the housing 200 to provide substantial room for access to the scanner 500. When the scanner holder 400 and the display device 300 are in the closed positions, the display device 300 is in a position on an opposite side of the scanner holder 400 as the document mover 600. It should be appreciated that when the display device 300 is in the closed position, the display device 300 blocks an operator from reaching and opening of the scanner holder 400.

More specifically, the scanner 500 includes a glass panel 510 and a scanning assembly (not shown or labeled) under the glass panel 510. The scanning assembly is configured to scan lottery ticket play slips such as in a conventional manner. The scanner 500 and particularly the scanner assembly is/are communicatively connected to the controller to send signals to the controller and to receive signals from the controller. The scanner 500 can be otherwise configured in accordance with the present disclosure. The scanner 500 can be made from any suitable materials in accordance with the present disclosure.

The document mover 600 includes an assembly that supports a plurality of rollers (not individually labeled) that are configured to engage and move the paper lottery ticket play slip past the scanner 500 at a desired rate of movement that enables the scanner 500 to scan the lottery ticket play slips. The document mover 600 can be otherwise configured in accordance with the present disclosure. The document mover 600 can be made from any suitable materials in accordance with the present disclosure.

The controller includes a processing device (or devices) communicatively connected to a memory device (or devices). For instance, the controller can be a programmable logic controller. The processing device can include any suitable processing device such as, but not limited to, a general-purpose processor, a special-purpose processor, a digital-signal processor, one or more microprocessors, one or more microprocessors in association with a digital-signal processor core, one or more application-specific integrated circuits, one or more field-programmable gate array circuits, one or more integrated circuits, and/or a state machine. The memory device can include any suitable memory device such as, but not limited to, read-only memory, random-access memory, one or more digital registers, cache memory, one or more semiconductor memory devices, magnetic media such as integrated hard disks and/or removable memory, magneto-optical media, and/or optical media. The memory device stores instructions executable by the processing device to control operation of the lottery terminal 100. The controller is communicatively and operably connected to the display device 300, the scanner 500, the document mover 600, the operator interface, and the power supply, and configured to receive signals from and send signals to those components. The controller can also be communicatively connectable (such as via Wi-Fi, Bluetooth, near-field communication, or other suitable wireless communications protocol) to an external device, such as a computing device, to send information to and receive information from that external device.

The power supply is electrically connected to (via suitable wiring and other components) and configured to power several components of the lottery terminal 100. The power supply can be any suitable electric power supply.

The lottery terminal 100 includes various other components (not shown) in or supported by the housing 200 that enable the lottery termina 100 to move lottery ticket play slips pass the scanner 500, cause the scanner 500 to read such lottery ticket play slips, and process and transmit data regarding such lottery ticket play slips. Such components are well known in the industry and thus not further described herein.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery terminal comprising:
a housing;
a scanner holder pivotally supported by the housing, the scanner holder is downwardly pivotal from a closed position to a fully open position;
a scanner supported by the scanner holder; and
a display device pivotally connected to the housing, the display device is upwardly pivotal from a closed position to a fully open position,
wherein the display device and the scanner holder are configured such that the display device needs to be pivoted toward its fully open position before the scanner holder can be downwardly pivoted toward its fully open position.

2. The lottery terminal of claim 1, wherein when the display device and the scanner holder are in their fully open positions, the display device and the scanner holder extend is substantially parallel planes.

3. The lottery terminal of claim 1, wherein when the display device is in the fully open position, the display device extends above the housing.

4. A lottery terminal comprising:
a housing;
a play slip reader comprising:
a document mover connected to the housing,
a scanner holder pivotally connected to the document mover, the scanner holder is downwardly pivotal from a closed position to a fully open position, and
a scanner supported by the scanner holder, wherein in the closed position, the scanner holder holds the scanner in a position facing the document mover; and
a display device pivotally connected to the housing, the display device is upwardly pivotal from a closed position to a fully open position, wherein in the closed position, the display device is in a position on an opposite side of the scanner holder as the document mover, wherein when the display device is in the fully open position, the display device extends above the housing.

5. The lottery terminal of claim 4, wherein when the display device and the scanner holder are in their fully open positions, the display device and the scanner holder extend is substantially parallel planes.

6. The lottery terminal of claim 4, wherein the display device comprises a display device frame, a display screen supported by the display device frame, a touch screen supported by the display device frame in front of the display screen, a first pivot arm connected to and extending from a first side of the display device frame and a second pivot arm connected to and extending from a second side of the display device frame.

7. The lottery terminal of claim 6, wherein each of the first pivot arm and the second pivot arm is J-shaped.

8. The lottery terminal of claim 7, wherein each of the first pivot arm and the second pivot arm comprises a first section fixedly connected to the display device frame, a second section pivotally connected to a display device supporter of the housing, and a third section connecting the first and second sections.

9. The lottery terminal of claim 8, wherein the scanner holder comprises a scanner holder frame, a first pivot stop fixedly connected to and extending from a first side of the scanner holder frame, and a second pivot stop fixedly connected to and extending from a second side of the scanner holder frame.

10. The lottery terminal of claim 9, wherein the first pivot stop of the scanner holder is curved and comprises a first section fixedly connected to the first side of the scanner holder frame, a second section, and a third section connecting the first and second sections, wherein the second and third sections are slidably connected to a first pin extending from the document mover, and wherein the second pivot stop of the scanner holder is curved and comprises a first section fixedly connected to the second side of the scanner holder frame, a second section, and a third section connecting the first and second sections, wherein the second and third sections are slidably connected to a second pin extending from the document mover.

11. The lottery terminal of claim 4, wherein the scanner holder comprises a first pivot stop slidably connected to a first pin of the housing, and wherein the scanner holder comprises a second pivot stop slidably connected to a second pin of the housing.

12. A lottery terminal comprising:
a housing;
a play slip reader comprising:
a document mover connected to the housing,
a scanner holder pivotally connected to the document mover, the scanner holder is downwardly pivotal from a closed position to a fully open position, and
a scanner supported by the scanner holder, wherein in the closed position, the scanner holder holds the scanner in a position facing the document mover; and
a display device comprising a display device frame pivotally connected to the housing, a display screen supported by the display device frame, a touch screen supported by the display device frame in front of the display screen, a first pivot arm connected to and extending from a first side of the display device frame and a second pivot arm connected to and extending from a second side of the display device frame, wherein each of the first pivot arm and the second pivot arm is J-shaped, wherein the display device is upwardly pivotal from a closed position to a fully open position with respect to the housing, wherein in the closed position, the display device is in a position on an opposite side of the scanner holder as the document mover, wherein when the display device is in the fully open position, the display device extends above the housing, wherein the display device and the scanner holder are configured such that the display device needs to be pivoted toward its fully open position before the scanner holder can be downwardly pivoted toward its fully open position.

13. The lottery terminal of claim 12, wherein when the display device and the scanner holder are in their fully open positions, the display device and the scanner holder extend is substantially parallel planes.

* * * * *